United States Patent [19]

Katoh et al.

[11] Patent Number: 5,423,181
[45] Date of Patent: Jun. 13, 1995

[54] EXHAUST GAS PURIFICATION DEVICE OF AN ENGINE

[75] Inventors: Kenji Katoh, Sunto; Satoshi Iguchi, Mishima; Tetsuro Kihara, Susono; Masato Gotoh, Susono; Shinichi Takeshima, Susono; Takamitsu Asanuma, Susono; Fumitada Murakami, Susono, all of Japan

[73] Assignee: Toyota Jidosha Kabushiki Kaisha, Toyota, Japan

[21] Appl. No.: 114,894

[22] Filed: Sep. 1, 1993

[30] Foreign Application Priority Data

Sep. 2, 1992 [JP] Japan .................. 4-234891
May 28, 1993 [JP] Japan .................. 5-127233

[51] Int. Cl.⁶ .............................. F01N 3/20
[52] U.S. Cl. ........................ 60/276; 60/285; 60/297; 60/301
[58] Field of Search ............ 60/276, 285, 297, 301

[56] References Cited

U.S. PATENT DOCUMENTS

| | | | |
|---|---|---|---|
| 5,174,111 | 12/1992 | Nomura | 60/285 |
| 5,209,061 | 5/1993 | Takeshima | 60/284 |
| 5,233,830 | 8/1993 | Takeshima | 60/301 |
| 5,270,024 | 12/1993 | Kasahara | 60/301 |
| 5,331,809 | 7/1994 | Takeshima | 60/289 |

FOREIGN PATENT DOCUMENTS

| | | |
|---|---|---|
| 0503882 | 3/1992 | European Pat. Off. . |
| 62-97630 | 5/1987 | Japan . |
| 62-106826 | 5/1987 | Japan . |
| 62-117620 | 5/1987 | Japan . |
| 3-124909 | 5/1991 | Japan . |
| 4-141219 | 5/1991 | Japan . |
| 3135417 | 6/1991 | Japan . |

OTHER PUBLICATIONS

NO Removal by Absorption into BaO-CuO Binary Oxides (J. Chem. Soc., Hm. Coummun., pp. 1165–1166), 1990.
Formation and Decomposition of BaCuO₂. 5 Prepared from a Mixture of Nitrates (Journal of Solid state chemistry, pp. 176–179), 1991.
NO Removal by Absorption into Ba-Cu-O Binary Oxides (Catalyst vol. 33 No. 2 pp. 87–90), 1991.

*Primary Examiner*—Douglas Hart
*Attorney, Agent, or Firm*—Kenyon & Kenyon

[57] ABSTRACT

An engine comprising an exhaust passage having therein a $NO_x$ absorbent which absorbs the $NO_x$ when the air-fuel ratio of the exhaust gas flowing into the $NO_x$ absorbent is lean and releases the absorbed $NO_x$ when the air-fuel ratio of the exhaust gas flowing into the $NO_x$ absorbent becomes the stoichiometric air-fuel ratio or rich. When the air-fuel ratio of the air-fuel mixture should be changed over from lean to the stoichiometric air-fuel ratio, the air-fuel ratio of the air-fuel mixture is temporarily made rich and is then made the stoichiometric air-fuel ratio.

10 Claims, 18 Drawing Sheets

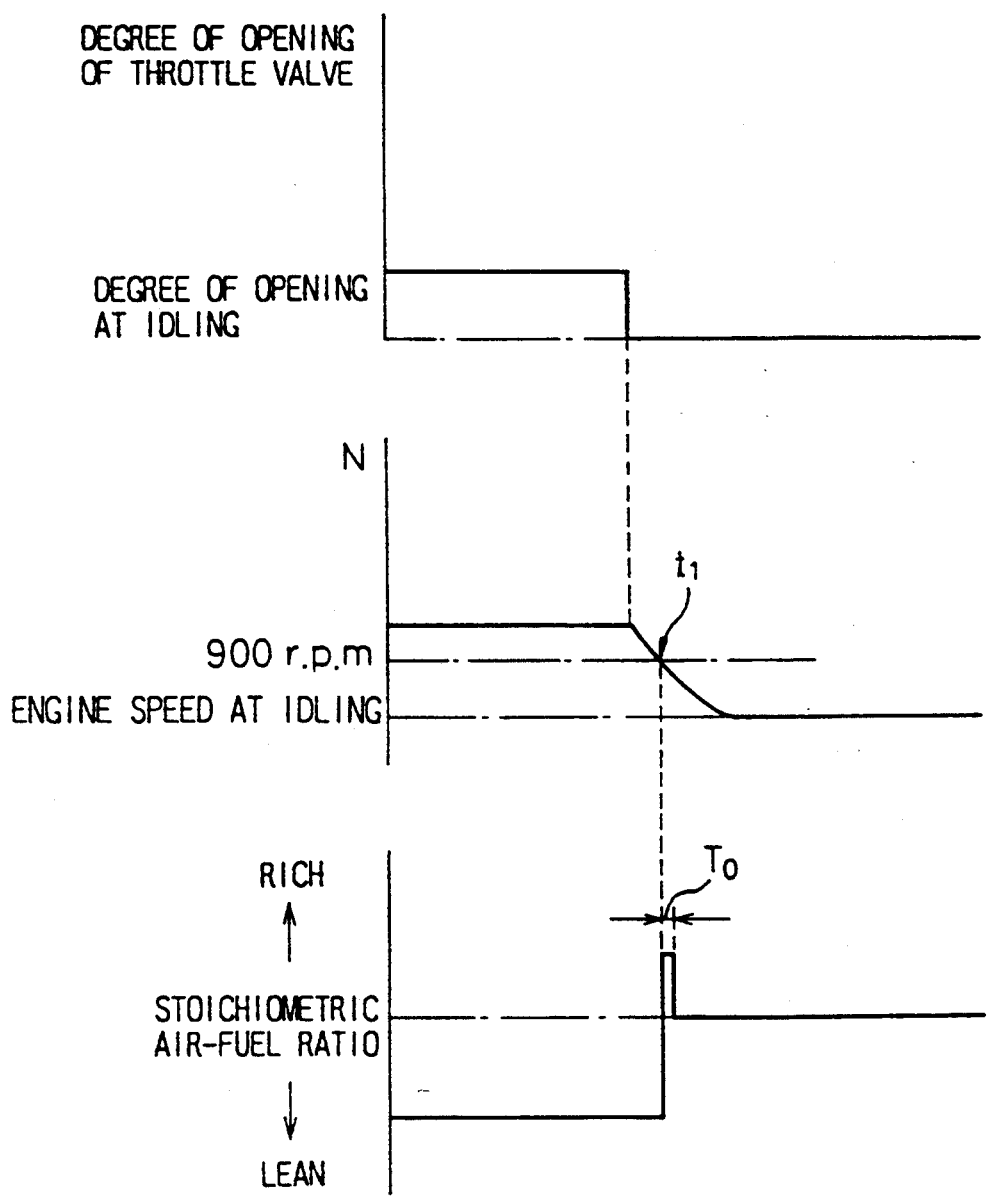

1

EXHAUST GAS PURIFICATION DEVICE OF AN ENGINE

BACKGROUND OF THE INVENTION

1. Field of the Invention

The present invention relates to an exhaust gas purification device of an engine.

2. Description of the Related Art

With respect to an engine in which a lean air-fuel mixture is burned, the same applicant has proposed a new type of engine in which a $NO_x$ absorbent is arranged in the exhaust passage of the engine. This $NO_x$ absorbent absorbs the $NO_x$ when the air-fuel ratio of the exhaust gas flowing into the $NO_x$ absorbent is lean, and this $NO_x$ absorbent releases the absorbed $NO_x$ when the concentration of oxygen in the exhaust gas flowing into the $NO_x$ absorbent is lowered. In this engine, when a lean air-fuel mixture continues to be burned for more than a predetermined time, the air-fuel ratio of air-fuel mixture fed into the engine cylinder is made the stoichiometric air-fuel ratio or a rich air-fuel ratio, and thus, the concentration of oxygen in the exhaust gas is lowered. As a result, the $NO_x$ is released from the $NO_x$ absorbent. At this time, the $NO_x$ thus released is reduced by unburned HC and CO discharged from the engine (see copending U.S. patent application Ser. No. 66,100 derived from PCT Application No. JP92/01279).

In this engine, however, when the air-fuel ratio of the air-fuel mixture fed into the engine cylinder is changed over from a lean air-fuel ratio to the stoichiometric air-fuel ratio, and thus, the $NO_x$ is released from the $NO_x$ absorbent, the amount of unburned HC and CO discharged from the engine is not sufficiently increased. As a result, the $NO_x$ released from the $NO_x$ absorbent can not be sufficiently reduced by the unburned HC and CO, and thus a problem arises in that the $NO_x$ is discharged into the outside air.

SUMMARY OF THE INVENTION

An object of the present invention is to provide an exhaust gas purification device capable of preventing the $NO_x$ from being discharged into the outside air when the operating state of the engine is changed over from an operating state in which a lean air-fuel mixture is to be burned to an operating state in which the air-fuel mixture of approximately the stoichiometric air-fuel ratio is to be burned.

According to the present invention, there is provided an exhaust gas purification device of an engine having an exhaust passage, the device comprising: a $NO_x$ absorbent arranged in the exhaust passage and absorbing $NO_x$ when an air-fuel ratio of exhaust gas flowing into the $NO_x$ absorbent is lean, the $NO_x$ absorbent releasing absorbed $NO_x$ when the concentration of oxygen in the exhaust gas flowing into the $NO_x$ absorbent is lowered; determining means for determining whether an engine operating region belongs to a first engine operating region in which an air-fuel ratio of an air-fuel mixture fed into the engine should be made approximately the stoichiometric air-fuel ratio or a second engine operating region in which the amount of fuel fed into the engine is reduced below the amount of fuel which is necessary to make the air-fuel ratio of the air-fuel mixture the stoichiometric air-fuel ratio; and an air-fuel ratio control means for controlling the air-fuel ratio of the air-fuel mixture to make the air-fuel ratio of the air-fuel mixture approximately the stoichiometric air-fuel ratio after temporarily making the air-fuel ratio of the air-fuel mixture rich when an engine operating region is changed over from the second engine operating region to the first engine operating region.

The present invention may be more fully understood from the description of preferred embodiments of the invention set forth below, together with the accompanying drawings.

BRIEF DESCRIPTION OF THE DRAWINGS

In the drawings:

FIG. 6 is a time chart for explaining a rich control of the air-fuel ratio;

DESCRIPTION OF PREFERRED EMBODIMENTS

Figure 1:
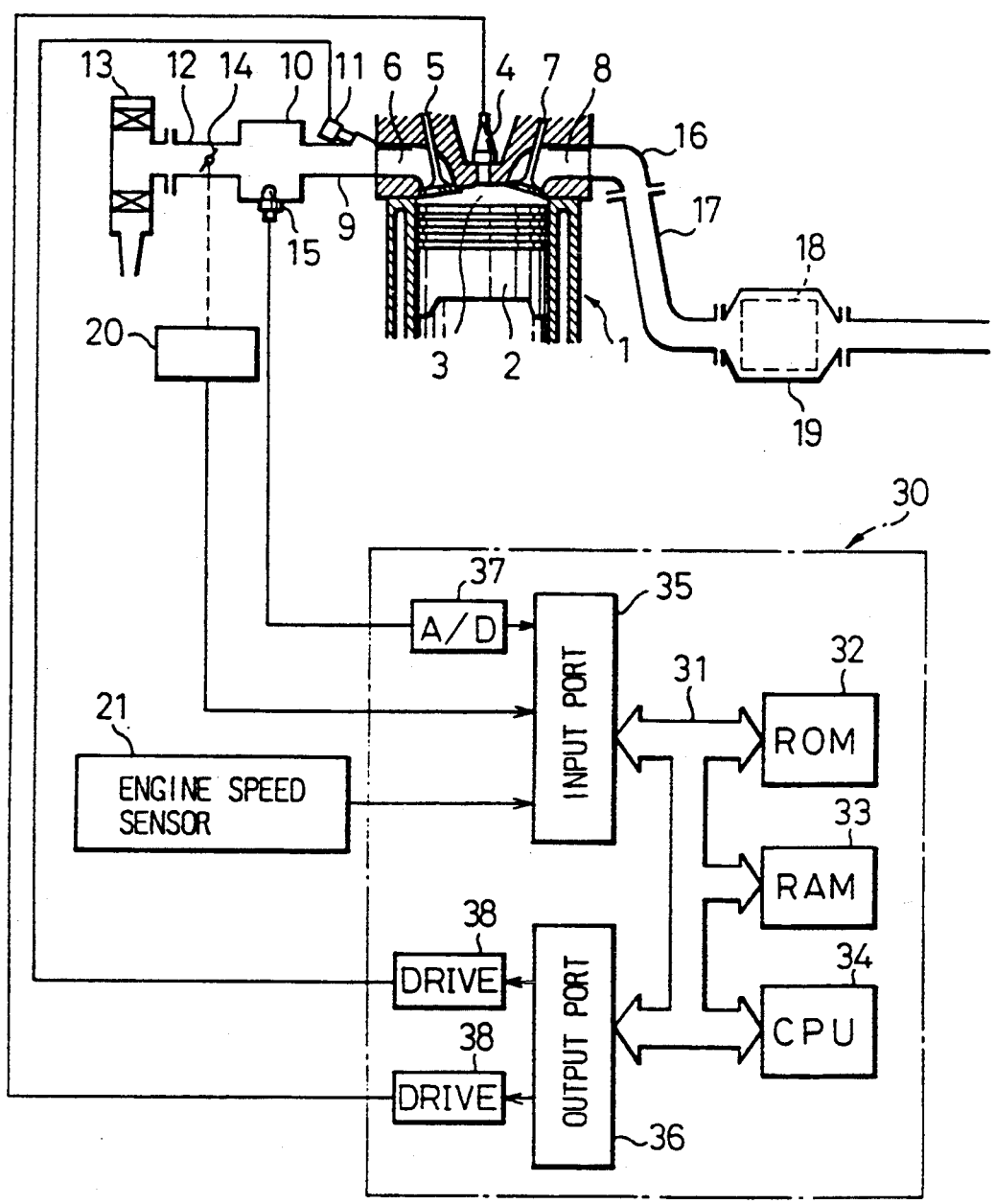
FIG. 1. is an overall view of an engine.

Referring to FIG. 1, reference numeral 1 designates an engine body, 2 a piston, 3 a combustion chamber, and 4 a spark plug; 5 designates an intake valve, 6 an intake port, 7 an exhaust valve, and 8 an exhaust port. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 13 via an intake duct 12, and a throttle valve 14 is disposed in the intake duct 12. The exhaust port 8 is connected via an exhaust manifold 16 and an exhaust pipe 17 to a casing 19 including an $NO_x$ absorbent 18.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. A pressure sensor 15 producing an output voltage which is proportional to the absolute pressure in the surge tank 10 is arranged in the surge tank 10, and the output voltage of the pressure sensor 15 is put into the input port 35 via an AD converter 37. A throttle sensor 20 producing an output signal indicating that the degree of the opening of the throttle valve 14 is equal to the degree of the opening at idling is attached to the throttle valve 14, and the output signal of the throttle sensor 20 is put into the input port 35. In addition, an engine speed sensor 21 generating an output pulse expressing the engine speed is connected to the input port 35. The output port 36 is connected via the corresponding driving circuits 38 to the spark plug 4 and fuel injector 11, respectively.

Figure 2:
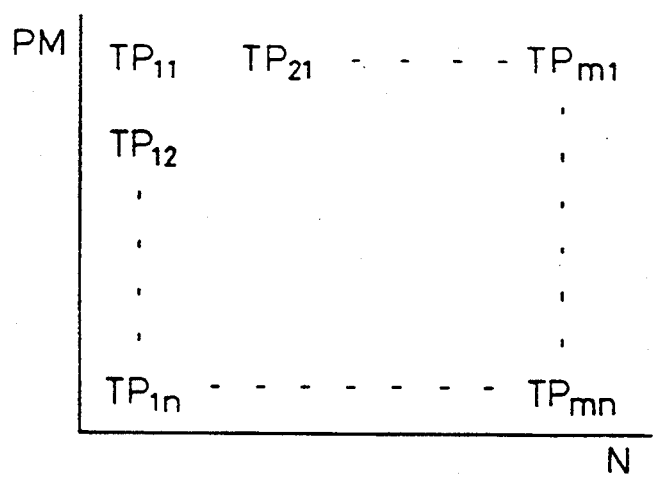
FIG. 2. is a view showing a map of a basic fuel injection time.

In the internal combustion engine shown in FIG. 1, the fuel injection time TAU is calculated based on, for example, the following equation.

$$TAU = TP \cdot K$$

where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiment and is stored in advance in the ROM 32 in the form of a map as shown in FIG. 2 as the function of the absolute pressure PM in the surge tank 10 and the engine speed N. The correction coefficient K is a coefficient for controlling the air-fuel ratio of the air-fuel mixture fed into the engine cylinder, and if K=1.0, the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

Figure 3:
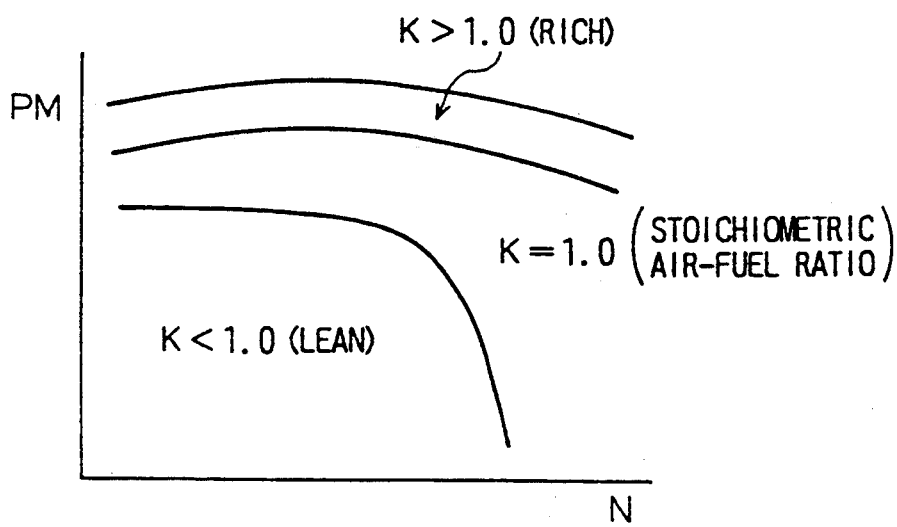
FIG. 3 is a diagram illustrating a change in the correction coefficient.

The value of the correction coefficient K is determined in advance on the basis of the engine speed N and the absolute pressure PM in the surge tank 10, and FIG. 3 illustrates an example of the value of the correction coefficient K. In the embodiment shown in FIG. 3, the value of the correction coefficient K is made a value less than 1.0 in an engine operating region in which the absolute pressure PM in the surge tank 10 is relatively low, i.e., in an engine low and middle load operating region. Accordingly, in this region, the air-fuel ratio of the air-fuel mixture fed into the engine cylinder is made a lean air-fuel ratio. Conversely, the value of the correction coefficient K is made 1.0 in an engine operating region in which the absolute pressure PM in the surge tank 10 is relatively high, i.e., in an engine heavy load operating region. Accordingly, in this region, the air-fuel ratio of the air-fuel mixture fed into the engine cylinder is made the stoichiometric air-fuel ratio.

In addition, the value of the correction coefficient K is made a value larger than 1.0 in an engine operating region in which the absolute pressure PM in the surge tank 10 becomes highest, i.e., in an engine full load operating region. Accordingly, in this region, the air-fuel ratio of the air-fuel mixture fed into the engine cylinder is made a rich air-fuel ratio. When the idling operation of the engine is carried out, the value of the correction coefficient K is made 1.0. Accordingly, at this time, the air-fuel ratio of the air-fuel mixture fed into the engine cylinder is made the stoichiometric air-fuel ratio. In an engine, normally, the frequency of the engine low and middle operating state is highest, and therefore, in a majority of the engine operating period, a lean air-fuel mixture is burned.

Figure 4:
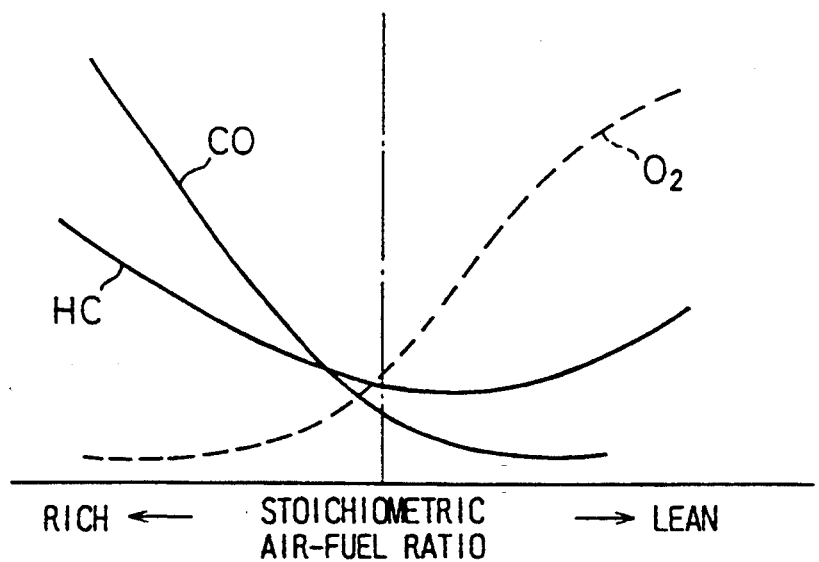
FIG. 4 is a diagram showing the concentration of unburned HC and CO and $O_2$ in the exhaust gas.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 18 contained in the casing 19 uses, for example, alumina as a carrier. On this carrier, at least one substance selected from alkali metals, for example, potassium K, sodium Na, lithium Li, and cesium Cs; alkali-earth metals, for example, barium Ba and calcium Ca; and rare-earth metals, for example, lanthanum La and yttrium Y and precious metals such as platinum Pt is carried. When referring to the ratio between the air and fuel (hydrocarbons) fed into the intake passage of the engine and the exhaust passage upstream of the $NO_x$ absorbent 18 as the air-fuel ratio of the inflowing exhaust gas to the $NO_x$ absorbent 18, this $NO_x$ absorbent 18 performs the absorption and releasing operation of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where the fuel (hydrocarbons) or air is not fed into the exhaust passage upstream of the $NO_x$ absorbent 18, the air-fuel ratio of the inflowing exhaust gas coincides with the air-fuel ratio of the air-fuel mixture fed into the combustion chamber 3. Accordingly, at this time, the $NO_x$ absorbent 18 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

Figure 5A:
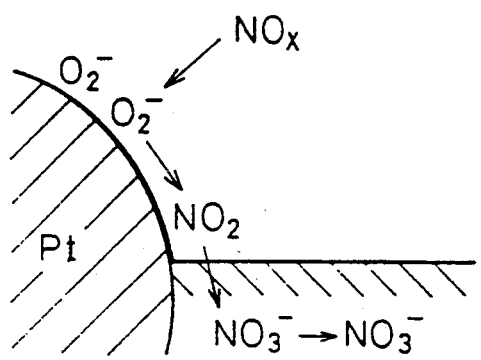
FIGS. 5A and 5B are views for explaining an absorbing and releasing operation of $NO_x$.
Figure 5B:
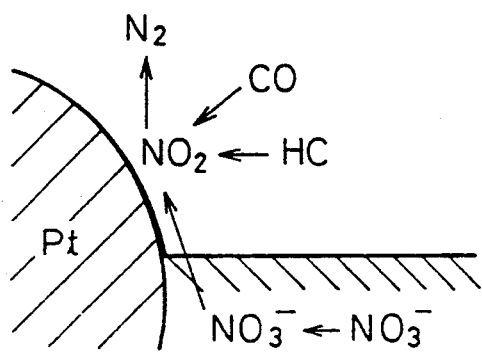

When the above-mentioned $NO_x$ absorbent 18 is disposed in the exhaust passage of the engine, this $NO_x$ absorbent 18 actually performs the absorption and releasing operation of $NO_x$, but there are areas of the exact mechanism of this absorption and releasing operation which are not clear. However, it can be considered that this absorption and releasing operation is conducted by the mechanism as shown in FIGS. 5A and 5B. This mechanism will be explained by using as an example a case where platinum Pt and barium Ba are carried on the carrier, but a similar mechanisms is obtained even if another precious metal, alkali metal, alkali earth metal, or rare earth metal is used.

Namely, when the inflowing exhaust gas becomes considerably lean, the concentration of oxygen in the inflowing exhaust gas is greatly increased. At this time, as shown in FIG. 5A, the oxygen $O_2$ is deposited on the surface of the platinum Pt in the form of $O_2^-$ or $O^{2-}$. The NO in the inflowing exhaust gas reacts with the $O_2^-$ or $O^{2-}$ on the surface of the platinum Pt and becomes $NO_2$ ($2NO + O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 5A. In this way, $NO_x$ is absorbed into the $NO_x$ absorbent 18.

So long as the oxygen concentration in the inflowing exhaust gas is high, the $NO_x$ is produced on the surface of the platinum Pt, and so long as the $NO_x$ absorption ability of the absorbent is not saturated, the $NO_x$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 18. As shown in FIG. 4, when the degree of leanness of the inflowing exhaust gas becomes low, the oxygen concentration in the inflowing exhaust gas is lowered, and accordingly when the degree of leanness of the inflowing exhaust gas is lowered, the $NO_x$ is released from the $NO_x$ absorbent 18 even if the air-fuel ratio of the inflowing exhaust gas is lean.

On the other hand, at this time, when the air-fuel ratio of the air-fuel mixture fed into the combustion chamber 3 is made rich and the air-fuel ratio of the inflowing exhaust gas becomes rich, as shown in FIG. 4, a large amount of unburnt HC and CO is discharged from the engine, and this unburnt HC and CO react with the oxygen $O_2^-$ or $O^{2-}$ on the platinum Pt and are oxidized. Also, when the air-fuel ratio of the inflowing exhaust gas becomes rich, the oxygen concentration in the inflowing exhaust gas is lowered considerably, and therefore the $NO_2$ is released from the absorbent. This $NO_2$ reacts with the unburnt HC and CO as shown in FIG. 5B and is reduced. In this way, when the $NO_2$ no longer exists on the surface of the platinum Pt, the $NO_2$ is successively released from the absorbent. Accordingly, when the air-fuel ratio of the inflowing exhaust gas is made rich, the $NO_x$ is released from the $NO_x$ absorbent 18 in a short time.

Namely, when the air-fuel ratio of the inflowing exhaust gas is made rich, first of all, the unburnt HC and CO immediately react with the $O_2^-$ or $O^{2-}$ on the platinum Pt and are oxidized, and subsequently if the unburnt HC and CO still remain even though the $O_2^-$ or $O^{2-}$ on the platinum Pt is consumed, the $NO_x$ released from the absorbent and the $NO_x$ discharged from the engine are reduced by these unburnt HC and CO. Accordingly, if the air-fuel ratio of the inflowing exhaust gas is made rich, the $NO_x$ absorbed in the $NO_x$ absorbent 18 is released therefrom in a short time and, in addition, the $NO_x$ thus released is reduced. Accordingly, it is possible to prevent the $NO_x$ from being discharged into the outside air.

In addition, also when the air-fuel ratio of the air-fuel mixture fed into the combustion chamber 3 is made the stoichiometric air-fuel ratio, and thus, the air-fuel ratio of the inflowing exhaust gas is made the stoichiometric air-fuel ratio, the unburned HC and CO in the exhaust gas react with the $NO_x$ on the surface of the platinum Pt, and the $NO_2$ on the surface of the platinum disappears. As a result, the $NO_x$ is released from the $NO_x$ absorbent 18. However, where the air-fuel ratio of the air-fuel mixture fed into the combustion chamber 3 is made the stoichiometric air-fuel ratio, since the amount of the unburned HC and CO in the exhaust gas is small, the $NO_x$ is gradually released from the $NO_x$ absorbent 18. Accordingly, at this time, it takes a relatively long time to release all the $NO_x$ absorbed in the $NO_x$ absorbent 18.

In this way, when a lean air-fuel mixture is fed into the combustion chamber 3, the $NO_x$ is absorbed in the $NO_x$ absorbent 18 and, when the air-fuel ratio of the air-fuel mixture fed into the combustion chamber 3 is made the stoichiometric or rich, the $NO_x$ absorbed in the $NO_x$ absorbent 18 is released, and the $NO_x$ thus released is reduced by the unburned HC and CO. In this case, the $NO_x$ released from the $NO_x$ absorbent 18 is sufficiently reduced by the unburned HC and CO when the air-fuel ratio of the air-fuel mixture fed into the combustion chamber 3 is changed over from lean to rich, and the $NO_x$ released from the $NO_x$ absorbent 18 is also sufficiently reduced by the unburned HC and CO after the air-fuel ratio of the air-fuel mixture fed into the combustion chamber 3 is changed over from lean to rich or the stoichiometric air-fuel ratio. However, when the air-fuel ratio of the air-fuel mixture fed into the combustion chamber 3 is changed over from lean to the stoichiometric air-fuel ratio, the $NO_x$ released from the $NO_x$ absorbent 18 is not sufficiently reduced, and thus the $NO_x$ is discharged into the outside air. Next, the reason for this matter will be described.

Namely, if the air-fuel ratio of the air-fuel mixture fed into the combustion chamber 3 is changed over from lean to rich, since the concentration of the oxygen in the exhaust gas is abruptly lowered, the $NO_x$ is released from the $NO_x$ absorbent 18, as mentioned above. However, if the air-fuel ratio of the air-fuel mixture fed into the combustion chamber 3 is changed over from lean to rich, since a large amount of the unburned HC and CO is discharged from the engine as illustrated in FIG. 4, the $NO_x$ released from the $NO_x$ absorbent 18 is sufficiently reduced by the unburned HC and CO.

In addition, the amount of the $NO_x$, which corresponds to the amount of the unburned HC and CO, is released from the $NO_x$ absorbent 18 after the air-fuel ratio of the air-fuel mixture fed into the combustion chamber 3 is changed from lean to rich. Accordingly, also at this time, the $NO_x$ released from the $NO_x$ absorbent 18 is sufficiently reduced by the unburned HC and CO. Similarly, the amount of the $NO_x$, which corresponds to the amount of the unburned HC and CO, is released from the $NO_x$ absorbent 18 after the air-fuel ratio of the air-fuel mixture fed into the combustion chamber 3 is changed over from lean to the stoichiometric air-fuel ratio. Accordingly, also at this time, the $NO_x$ released from the $NO_x$ absorbent 18 is sufficiently reduced by the unburned HC and CO.

Furthermore, also when the air-fuel ratio of the air-fuel mixture fed into the combustion chamber 3 is changed over from lean to the stoichiometric air-fuel ratio, since the concentration of the oxygen in the exhaust gas is lowered, the $NO_x$ is released from the $NO_x$ absorbent 18. However, as can be seen from FIG. 4, even if the air-fuel ratio of the air-fuel mixture fed into the combustion chamber 3 is changed over from lean to the stoichiometric air-fuel ratio, the amount of the unburned HC and CO discharged from the engine is not considerably increased, and thus, at this time, the amount of the unburned HC and CO discharged from the $NO_x$ absorbent 18 is smaller than the amount of the unburned HC and CO which is capable of reducing all the $NO_x$ released from the $NO_x$ absorbent 18. Therefore, at this time, the $NO_x$ released from the $NO_x$ absorbent 18 can not be sufficiently reduced, and thus, the $NO_x$ is discharged into the outside air.

Therefore, in the present invention, when the air-fuel ratio of the air-fuel mixture fed into the combustion chamber 3 is to be changed over from lean to the stoichiometric air-fuel ratio, initially, the, air-fuel ratio of the air-fuel mixture fed into the combustion chamber 3 is temporarily made rich and is then made the stoichiometric air-fuel ratio. If the air-fuel ratio of the air-fuel mixture fed into the combustion chamber 3 is temporarily made rich as mentioned above, a large amount of the unburned HC and CO is discharged from the engine. Accordingly, at this time, the $NO_x$ released from the $NO_x$ absorbent 18 is sufficiently reduced by the unburned HC and CO. In addition, the amount of the $NO_x$, which corresponds to the amount of the unburned HC and CO, is released from the $NO_x$ absorbent 18 after the air-fuel ratio of the air-fuel mixture fed into the combustion chamber 3 is changed over from rich to the stoichiometric air-fuel ratio. Accordingly, also at this time, the $NO_x$ released from the $NO_x$ absorbent 18 is sufficiently reduced by the unburned HC and CO.

Next, the embodiment according to the present invention will be described with reference to FIGS. 6 through 8.

As mentioned earlier, in the embodiment according to the present invention, when the idling operation of the engine is carried out, the air-fuel ratio of the air-fuel mixture fed into the combustion chamber 3 is made the stoichiometric air-fuel ratio. In this case, in the embodiment according to the present invention, it is determined that the idling operation of the engine is carried out when the degree of the opening of the throttle valve 14 becomes equal to the degree of the opening at idling and when the engine speed N becomes lower than 900 r.p.m. Accordingly, it is determined that the operating state of the engine becomes an idling state (time $t_1$ of FIG. 6) when the engine speed N becomes lower than 900 r.p.m. after the throttle valve 14 is closed to an idling position from a slightly open position as illustrated in FIG. 6. As can been seen from FIG. 3, when the throttle valve 14 is slightly open, the air-fuel mixture fed into the combustion chamber 3 is lean. Accordingly, when it is determined that the operating state of the engine becomes an idling state at time $t_1$, the target air-fuel ratio of the air-fuel mixture to be fed into the combustion chamber 3 is changed over from lean to the stoichiometric air-fuel ratio. At this time, in the embodiment according to the present invention, the air-fuel ratio of the air-fuel mixture fed into the combustion chamber 3 is temporarily made rich as shown by $T_o$ in FIG. 6 and then made the stoichiometric air-fuel ratio.

Figure 7:
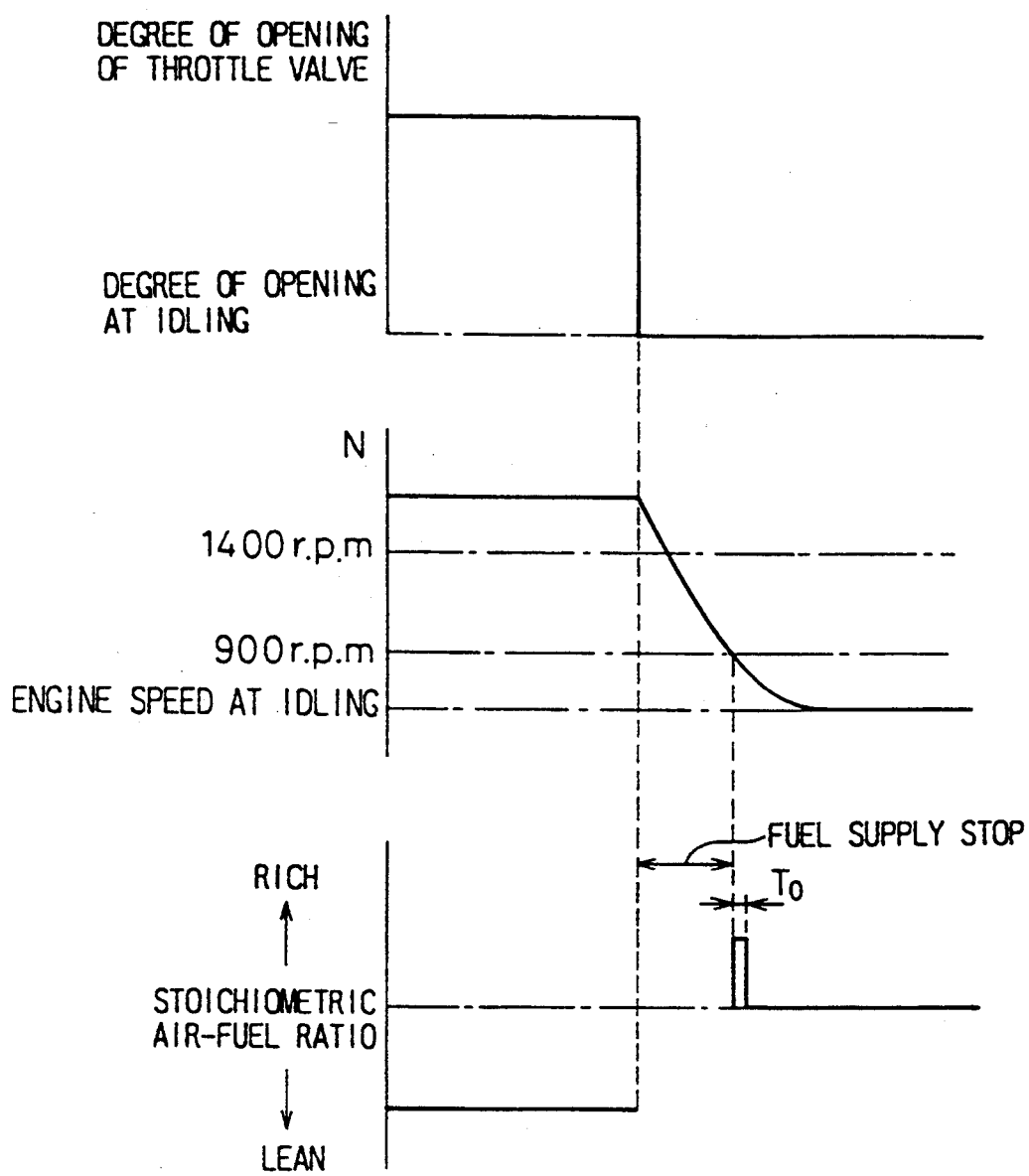
FIG. 7 is a time chart for explaining a rich control of the air-fuel ratio.
Figure 8:
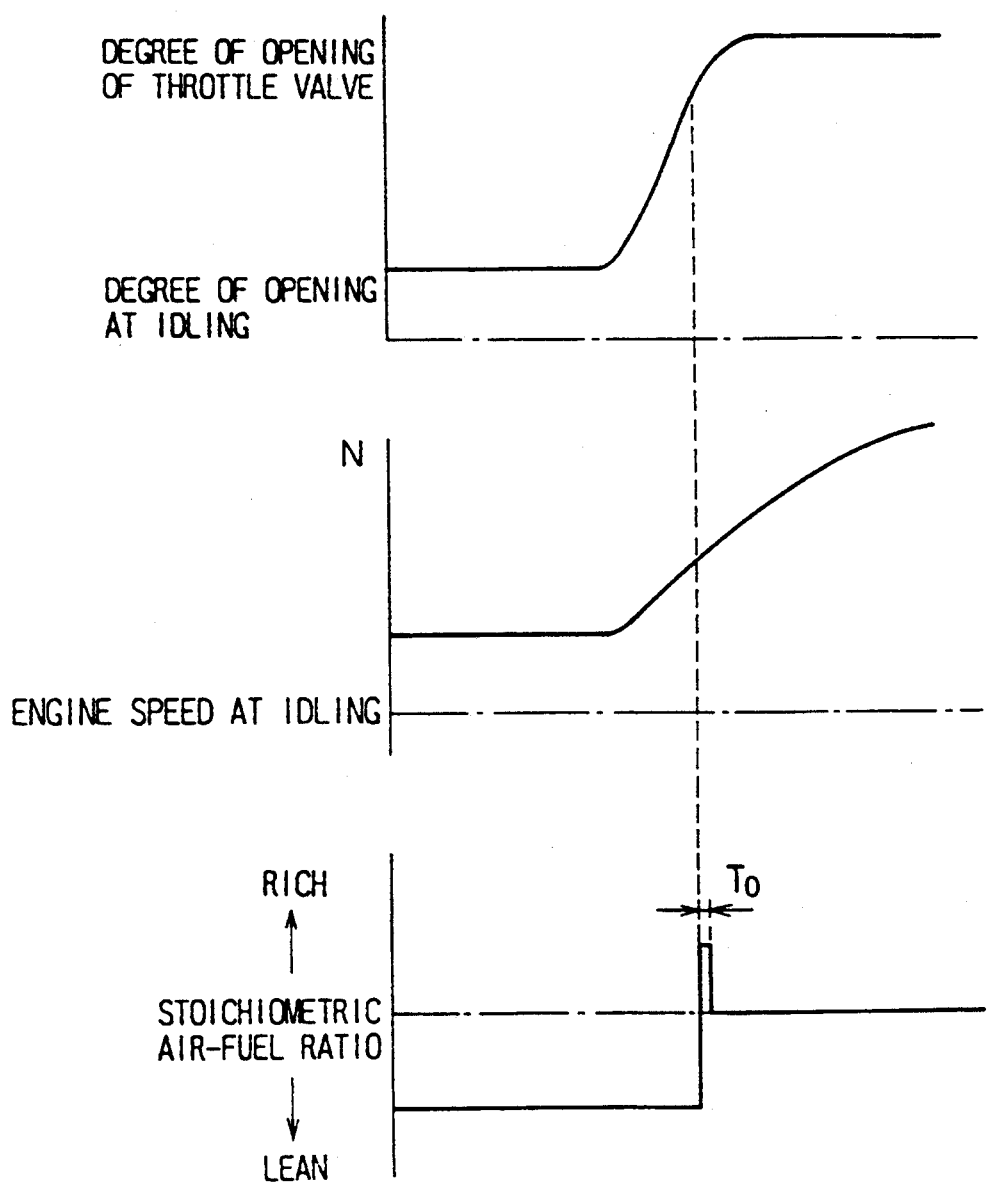
FIG. 8 is a time chart for explaining a rich control of the air-fuel ratio.

In addition, in the embodiment according to the present invention, if the engine speed N is higher than 1400 r.p.m. when the throttle valve 17 is closed to the idling position as shown in FIG. 7, the supply of fuel is stopped, and when the engine speed N becomes lower than 900 r.p.m. thereafter, the supply of fuel is started again. Accordingly, it is determined that the operating state of the engine is an idling state when the supply of fuel is started again, and thus, at this time, the target air-fuel ratio of the air-fuel mixture to be fed into the combustion chamber 3 becomes the stoichiometric air-fuel ratio. In the embodiment according to the present invention, also at this time, as shown by $T_o$ in FIG. 7, the air-fuel ratio of the air-fuel mixture fed into the combustion chamber 3 is temporarily made rich as soon as the supply of fuel is started. Then, the air-fuel ratio of the air-fuel mixture fed into the combustion chamber 3 is made the stoichiometric air-fuel ratio.

In addition, in the embodiment according to the present invention, as illustrated in FIG. 3, when the engine is operating under a heavy load, the air-fuel ratio of the air-fuel mixture fed into the combustion chamber 3 is made the stoichiometric air-fuel ratio ($K=1.0$). Accordingly, when the degree of the opening of the throttle valve 14 is caused to become large as shown in FIG. 8, and thus, the operating state of the engine is shifted to the engine heavy load operating region, the target air-fuel ratio of the air-fuel mixture to be fed into the combustion chamber 3 is changed over from lean to the stoichiometric air-fuel ratio. In the embodiment according to the present invention, also at this time, the air-fuel ratio of the air-fuel mixture fed into the combustion chamber 3 is temporarily made rich as shown by $T_o$ in FIG. 8 and is then made the stoichiometric air-fuel ratio.

Next, a first embodiment of the air-fuel ratio control according to the present invention will be described with reference to FIGS. 9, 10A and 10B.

Figure 9:
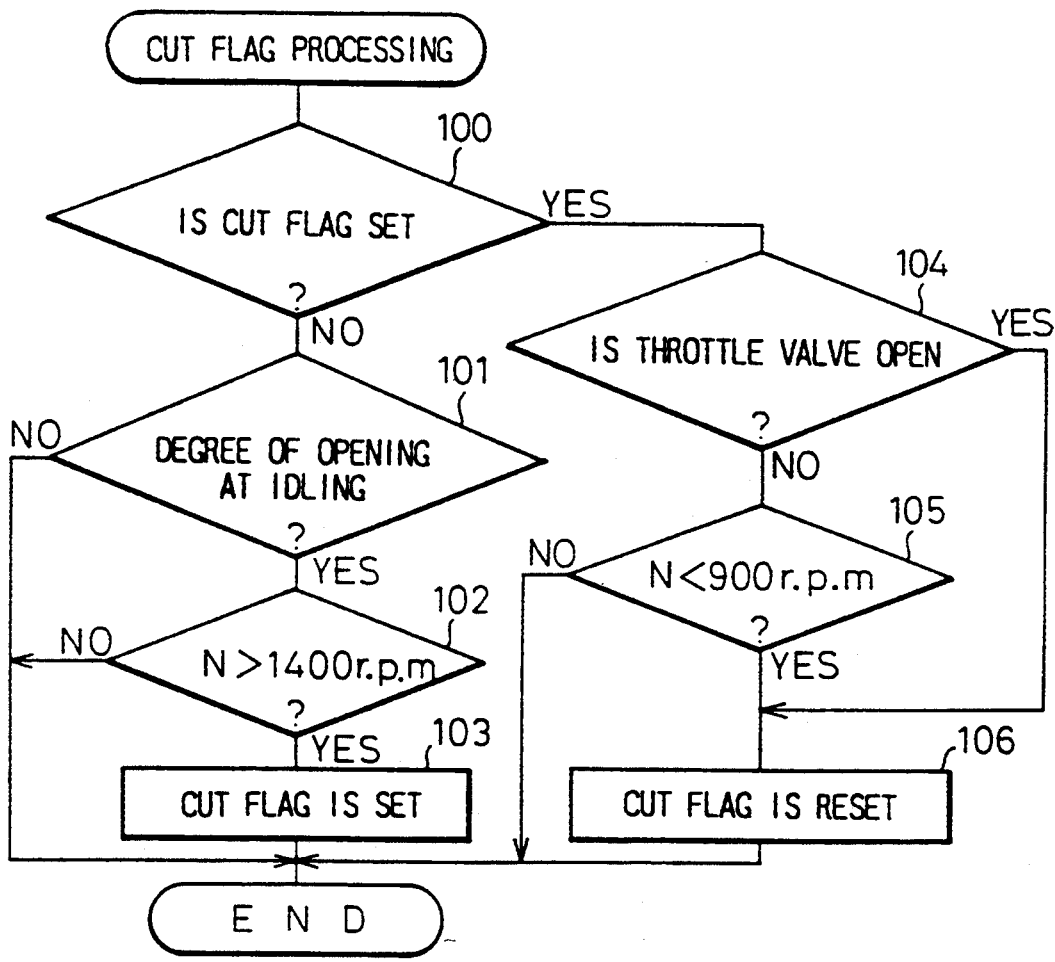
FIG. 9 is a flowchart for processing a cut flag.

FIG. 9 illustrates a routine for processing a cut flag indicating that the injection of fuel should be stopped, and this routine is processed by sequential interruptions which are executed at predetermined fixed intervals.

Referring to FIG. 9, in step 100, it is determined whether or not the cut flag indicating that the injection of fuel should be stopped is set. When the cut flag is not set, the routine goes to step 101, and it is determined based on the output signal of the throttle sensor 20 whether or not the degree of the opening of the throttle valve 14 is the degree of the opening at idling. When the degree of the opening of the throttle valve 14 is the degree of the opening at idle, the routine goes to step 102, and it is determined whether or not the engine speed N is higher than a predetermined speed, for example, 1400 r.p.m. If $N>1400$ r.p.m., the routine goes to step 103. Namely, when the degree of the opening of the throttle valve 14 is the degree of the opening at idling, and the engine speed N is higher than 1400 r.p.m., it is determined that the decelerating operation of the engine in which the injection of fuel should be stopped is carried out. At this time, the routine goes to step 103, and the cut flag is set. If the cut flag is set, the injection of fuel is stopped as hereinafter described.

If the cut flag is set, the routine goes to step 104 from step 100, and it is determined based on the output signal of the throttle sensor 20 whether or not the throttle valve 14 is open. When the throttle valve 14 is not open, the routine goes to step 105, and it is determined whether or not the engine speed N becomes lower than a predetermined speed, for example, 900 r.p.m. If $N \geq 900$ r.p.m., the processing cycle is completed. Conversely, when it is determined in step 104 that the throttle valve 14 is open, or when it is determined in step 105 that $N<900$ r.p.m., the routine goes to step 106, and the cut flag is reset. If the cut flag is reset, the injection of fuel is started as hereinafter described.

Figure 10A:
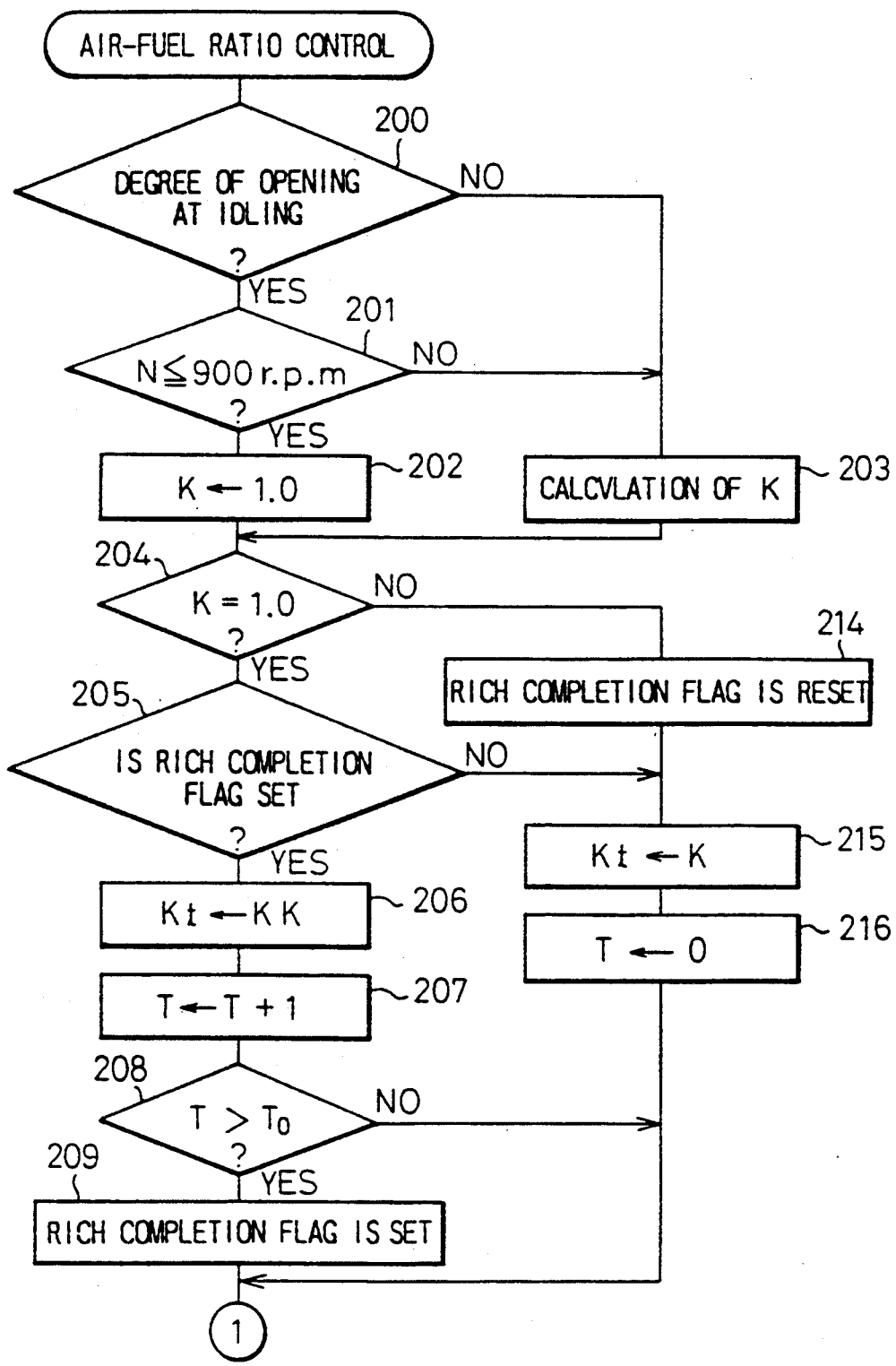
FIGS. 10A and 10B are a flowchart for executing the air-fuel ratio control.
Figure 10B:
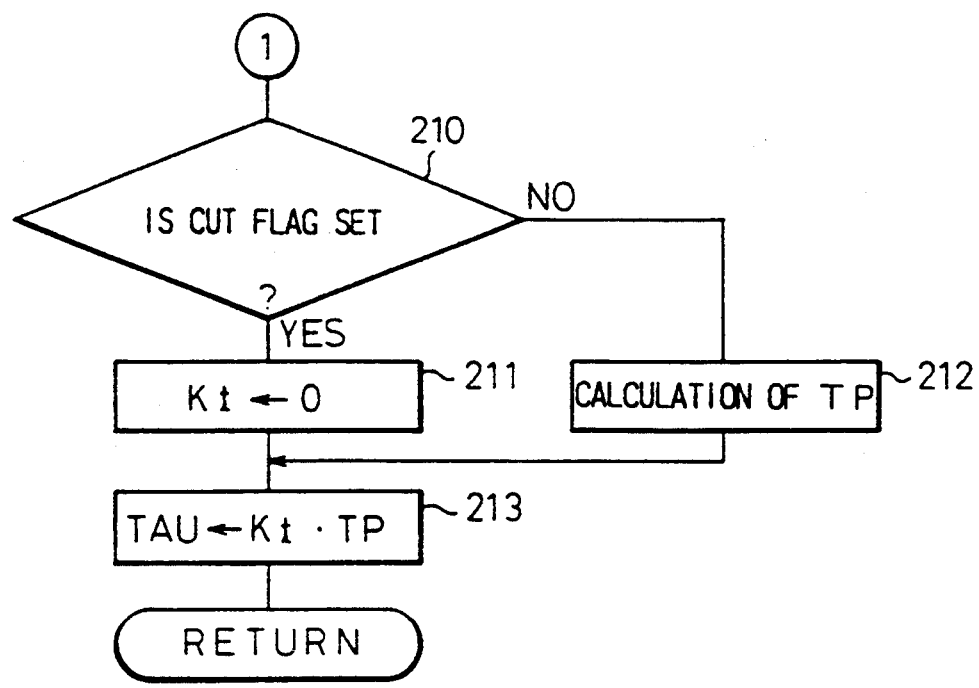

FIGS. 10A and 10B illustrates a routine for controlling an air-fuel ratio, and this routine is repeatedly executed.

Referring to FIGS. 10A and 10B, in step 200, it is determined whether or not the degree of the opening of the throttle valve 14 is the degree of the opening at idling. When the degree of the opening of the throttle valve 14 is the degree of the opening at idling, the routine goes to step 201, and it is determined whether or not the engine speed N is lower than 900 r.p.m. If $N \leq 900$ r.p.m., the routine goes to step 202. Namely, when the degree of the opening of the throttle valve 14 is the degree of the opening at idling, and the engine speed N is lower than 900 r.p.m., it is determined that the idling operation of the engine is carried out, and the routine goes to step 202. In step 202, the value of the correction coefficient K is made 1.0, i.e., the target air-fuel ratio of the air-fuel mixture to be fed into the combustion chamber 3 is made the stoichiometric air-fuel ratio, and then the routine goes to step 204. Conversely, when the degree of the opening of the throttle valve 14 is not the degree of the opening at idling, or when N>900 r.p.m., the routine goes to step 203, and the value of the correction coefficient K is calculated from the engine speed N and the absolute pressure PM in the surge tank 10 on the basis of the relationship shown in FIG. 3. Then, the routine goes to step 204.

In step 204, it is determined whether or not the value of the correction coefficient K is equal to 1.0, i.e., the target air-fuel ratio of the air-fuel mixture to be fed into the combustion chamber 3 is the stoichiometric air-fuel ratio. When K=1.0, the routine goes to step 205, and it is determined whether or not a rich completion flag indicating that a process of temporarily making the air-fuel ratio rich is completed is set. When the routine initially goes to step 205 after the value of the correction coefficient K becomes equal to 1.0, the rich completion flag is not set. Accordingly, at this time, the routine goes to step 206, and the value of the correction coefficient $K_t$ is made a predetermined value KK. This predetermined value KK is a value between about 1.1 and 1.2 which makes the air-fuel ratio of the air-fuel mixture a ratio between about 12.0:1 to 13.5:1.

Then, in step 207, the count value T is incremented by one, and then in step 208, it is determined whether or not the count value T has become larger than a predetermined value $T_o$. If $T \leq T_o$, the routine goes to step 210, and it is determined whether or not the cut flag is set. When the cut flag is set, the routine goes to step 211, and the value of the correction coefficient $K_t$ is made zero. Then, the routine goes to step 213. Conversely, when the cut flag is not set, the routine goes to step 212. In step 212, the basic fuel injection time TP is calculated from the engine speed N and the absolute pressure PM in the surge tank 10 on the basis of the map shown in FIG. 2, and then, the routine goes to step 213. In step 213, the fuel injection time TAU ($=K_t\cdot$TP) is calculated by multiplying the basic fuel injection time TP by the correction coefficient $K_t$.

When it is determined in step 208 that $T>T_o$, the routine goes to step 209, and the rich completion flag is set. Then, the routine goes to step 213 via steps 210 and 211 or via steps 210 and 212. If the rich completion flag is set, the routine goes to step 215 from step 205, and the value of the correction coefficient $K_t$ is made the value of the correction coefficient K. Then, in step 216, the count value T is made zero. Then, the routine goes to step 213 via steps 210 and 211 or via steps 210 and 212. Accordingly, if the value of the correction coefficient K becomes equal to 1.0, i.e., the target air-fuel ratio of the air-fuel mixture fed into the combustion chamber 3 becomes the stoichiometric air-fuel ratio, the air-fuel ratio of the air-fuel mixture fed into the combustion chamber 3 is made rich ($K_t=KK$) during the predetermined time $T_o$ as long as the cut flag is not set. After this, when the predetermined time $T_o$ has elapsed, the air-fuel ratio of the air-fuel mixture fed into the combustion chamber 3 is made the stoichiometric air-fuel ratio ($K_t=K$).

When it is determined in step 204 that the correction coefficient K is not equal to 1.0, i.e., the target air-fuel ratio of the air-fuel mixture fed into the combustion chamber 3 is lean or rich, the routine goes to step 214, and the rich completion flag is reset. Then, the routine goes to step 215, and the value of the correction coefficient $K_t$ is made the value of the correction coefficient K. Accordingly, at this time, the air-fuel mixture fed into the combustion chamber 3 is made lean or rich as long as the cut flag is not set. Note that, where the cut flag is set, since the value of the correction coefficient $K_t$ is made zero at step 211, the injection of fuel is stopped.

FIGS. 11 through 14 illustrate a second embodiment of an air-fuel ratio control according to the present invention.

Figure 11:
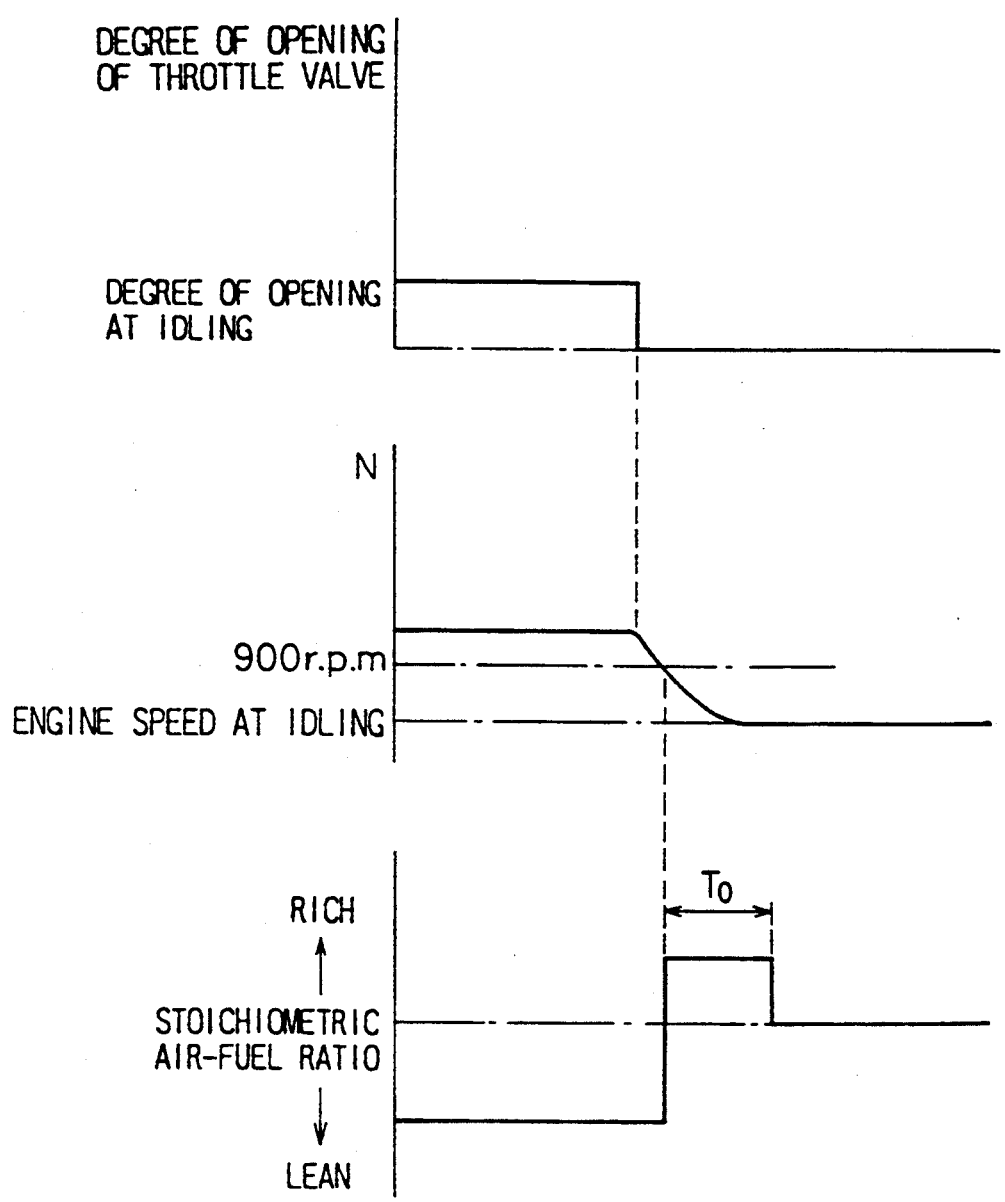
FIG. 11 is a time chart for explaining a rich control of the air-fuel ratio.
Figure 12:
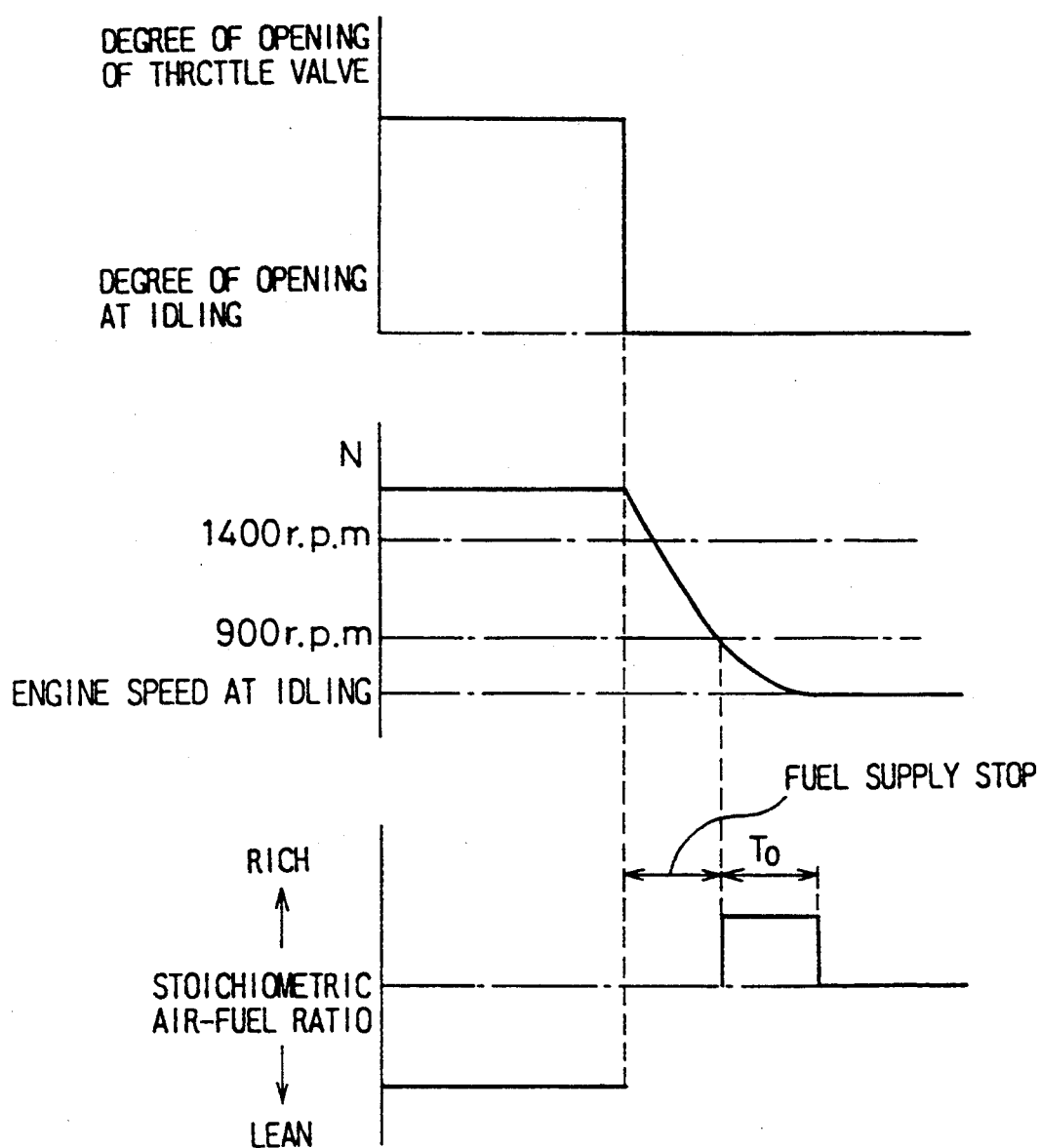
FIG. 12 is a time chart for explaining a rich control of the air-fuel ratio.
Figure 13:
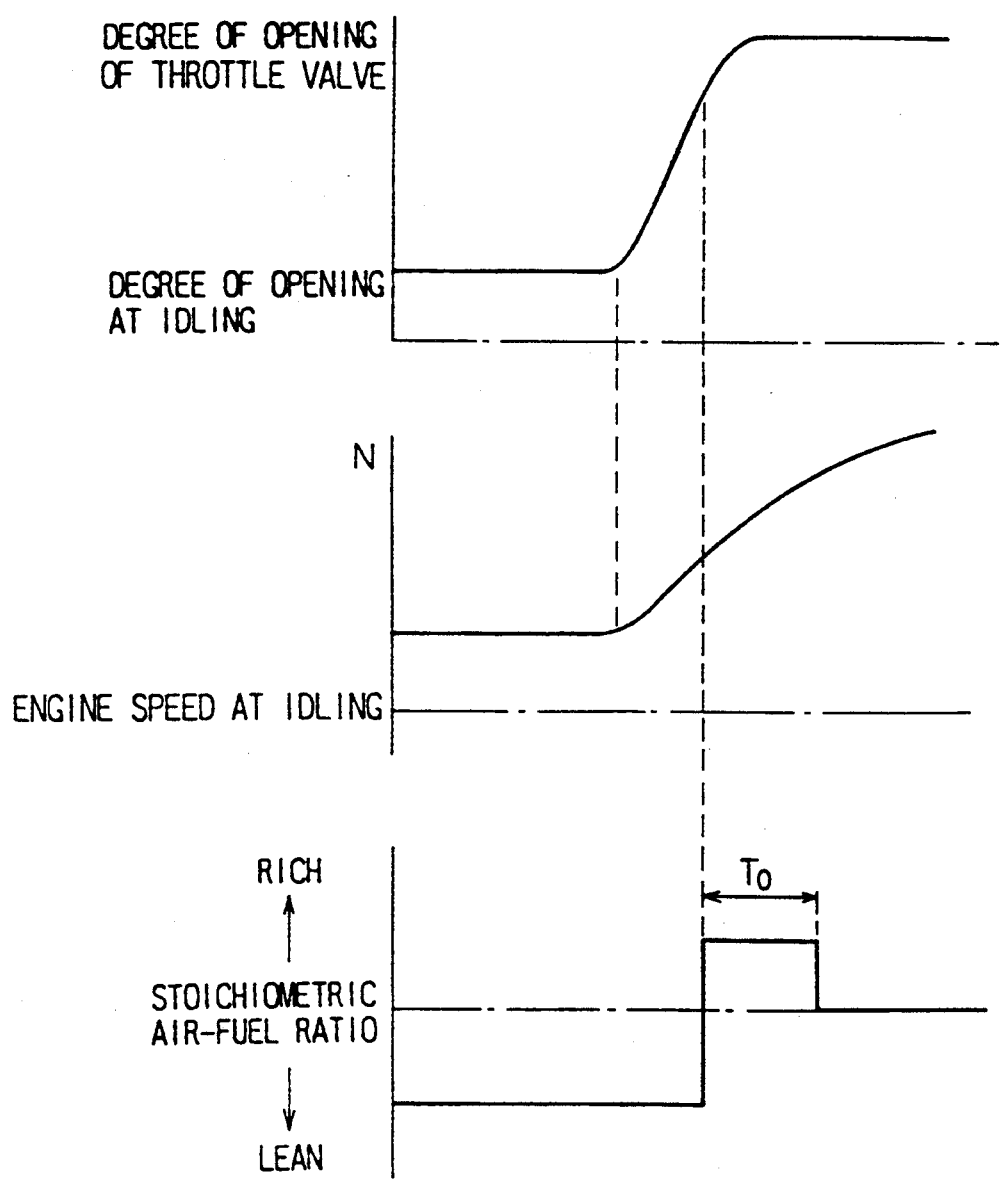
FIG. 13 is a time chart for explaining a rich control of the air-fuel ratio.

FIG. 11 illustrates the case where the operating state of the engine is shifted to an idling state in the same manner as that in FIG. 6, and FIG. 12 illustrates the case where the injection of fuel is stopped when the engine is decelerated in the same manner as that in FIG. 7. In addition, FIG. 13 illustrates the case where the operating state of the engine is shifted to a heavy load state in the same manner as that in FIG. 8. As can seen from FIGS. 11, 12 and 13, also in this second embodiment, when the target air-fuel ratio of the air-fuel mixture is changed over from lean to the stoichiometric air-fuel ratio, the air-fuel ratio of the air-fuel mixture fed into the combustion chamber 3 is temporarily rich and is then made the stoichiometric air-fuel ratio, but, in this second embodiment, the time $T_o$ during which the air-fuel mixture fed into the combustion chamber 3 is made rich to positively release the $NO_x$ from the $NO_x$ absorbent 18 is made longer as compared with the first embodiment.

Namely, if a lean mixture continues to be burned, the amount of the $NO_x$ absorbed and accumulated in the $NO_x$ absorbent 18 is gradually increased. In this case, if the absorbing ability of the $NO_x$ of the $NO_x$ absorbent 18 is saturated, the $NO_x$ absorbent 18 no longer can absorb the $NO_x$. Accordingly, it is necessary to release the $NO_x$ from the $NO_x$ absorbent 18 before the absorbing ability of the $NO_x$ of the $NO_x$ absorbent 18 is saturated. Therefore, in the second embodiment, the air-fuel mixture fed into the combustion chamber 3 is made rich for a relatively long time $T_o$ everytime the target air-fuel ratio of the air-fuel mixture fed into the combustion chamber 3 becomes the stoichiometric air-fuel ratio so that the $NO_x$ can be released from the $NO_x$ absorbent 18 in this time.

Note that, the air-fuel mixture fed into the combustion chamber 3 may be made rich to release the $NO_x$ from the $NO_x$ absorbent 18 when a lean air-fuel mixture is burned. However, if the air-fuel mixture is changed over from lean to rich as mentioned above, the amount of fuel injection is considerably increased. Conversely, if the air-fuel ratio of the air-fuel mixture fed into the combustion chamber is changed over from the stoichiometric air-fuel ratio to rich, the increase in the fuel consumption becomes smaller as compared with the case where the air-fuel mixture is changed over from lean to rich. Accordingly, to reduce the amount of the fuel consumption, it is preferable that the air-fuel mixture be made rich when the target air-fuel ratio of the air-fuel mixture fed into the combustion chamber 3 is the stoichiometric air-fuel ratio, as in the embodiment according to the present invention.

Figure 14:
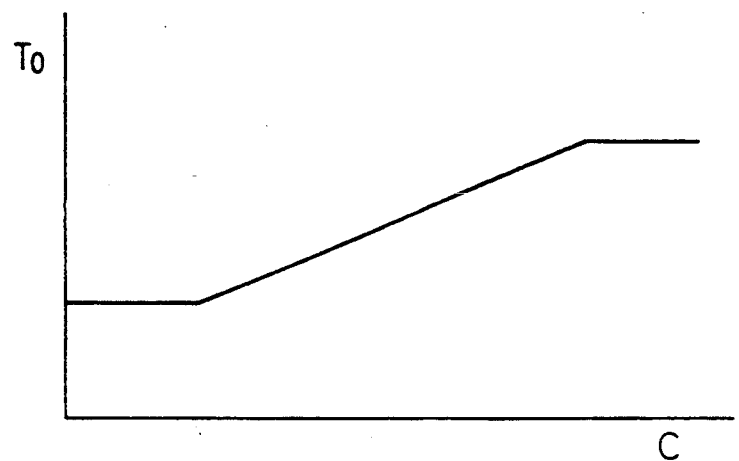
FIG. 14 is a diagram illustrating the relationship between the count value C and the time $T_o$.

In addition, the amount of the $NO_x$ absorbed and accumulated in the $NO_x$ absorbent 18 becomes smaller as the time during which a lean air-fuel mixture continues to be burned becomes shorter. In this case, where the amount of the $NO_x$ absorbed and accumulated in the $NO_x$ absorbent 18 is small, even if the time $T_o$ during which the air-fuel mixture is made rich is shortened, it is possible to release all the $NO_x$ absorbed in the $NO_x$ absorbent 18 therefrom. Accordingly, in the second embodiment, as illustrated in FIG. 14, the time $T_o$ during which the air-fuel mixture is made rich is made shorter as the time C during which a lean air-fuel mixture continues to be burned becomes shorter. Note that, the relationship between C and $T_o$ shown in FIG. 14 is stored in advance in the ROM 32.

In addition, in the second embodiment, as illustrated in FIG. 12, the air-fuel mixture is made rich when the injection of fuel is started, i.e., after the engine speed N drops considerably. In this case, the amount of air fed into the combustion chamber 3 per a unit time becomes smaller as the engine speed N becomes low. Accordingly, to make the air-fuel ratio rich up to the same richness, the amount of fuel to be increased becomes smaller as the engine speed N becomes low. Therefore, as illustrated in FIG. 12, if the air-fuel mixture is made rich when the engine speed N drops, the amount of the fuel consumption can be reduced. In addition, the efficiency of the $NO_x$ releasing operation from the $NO_x$ absorbent 18 becomes high as the velocity of the exhaust gas flowing within the $NO_x$ absorbent 18 becomes low. Accordingly, as illustrated in FIG. 12, if the air-fuel mixture is made rich when the engine speed N drops considerably, a good releasing operation of the $NO_x$ from the $NO_x$ absorbent 18 can be obtained.

In addition, when the operating state of the engine is shifted to an idling state as illustrated in FIGS. 11 and 12, if the air-fuel mixture fed into the combustion chamber 3 is made rich for a relatively long time, carbons are more easily accumulated around the electrode of the spark plug 4. In this case, if a large amount of carbons are accumulated around the electrode of the spark plug 4, an ignition electric current leakage via the carbons occurs. As a result, since a good ignition cannot be obtained, the engine speed N drops. Therefore, in the second embodiment, where the idling operation of the engine is carried out, and the air-fuel mixture fed into the combustion chamber 3 is made rich, if the engine speed N drops to a fixed speed, for example, 500 r.p.m., the air-fuel ratio of the air-fuel mixture fed into the combustion chamber 3 is immediately changed over from rich to the stoichiometric air-fuel ratio. If the air-fuel ratio of the air-fuel mixture fed into the combustion chamber 3 is changed over from rich to the stoichiometric air-fuel ratio, since the accumulated carbons are burned out, the leakage of the ignition electric current ceases. As a result, since the engine speed N increases, it is possible to prevent the occurrence of an engine stall.

Figure 15A:
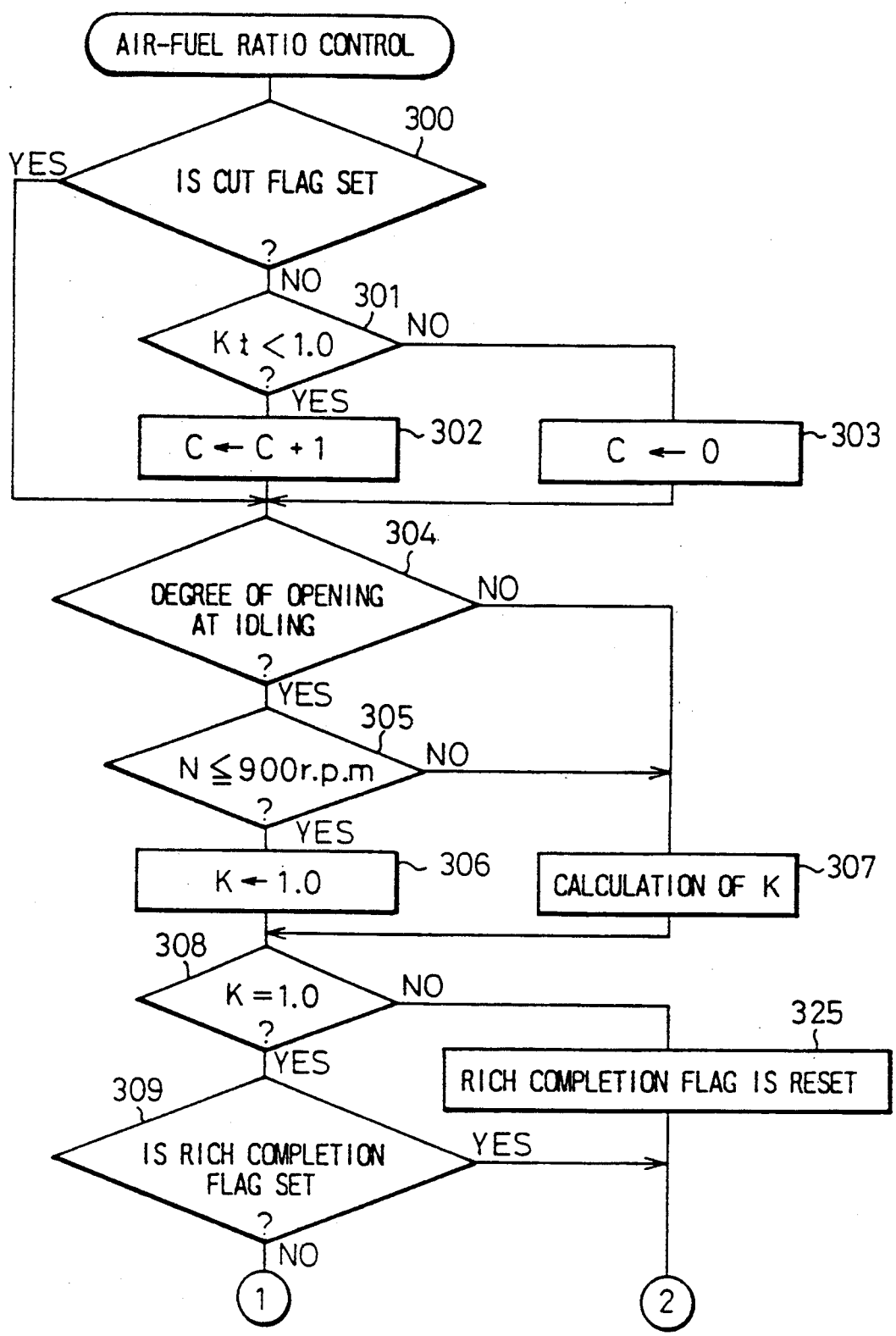
FIGS. 15A and 15B are a flowchart of a second embodiment for executing the air-fuel ratio control.
Figure 15B:
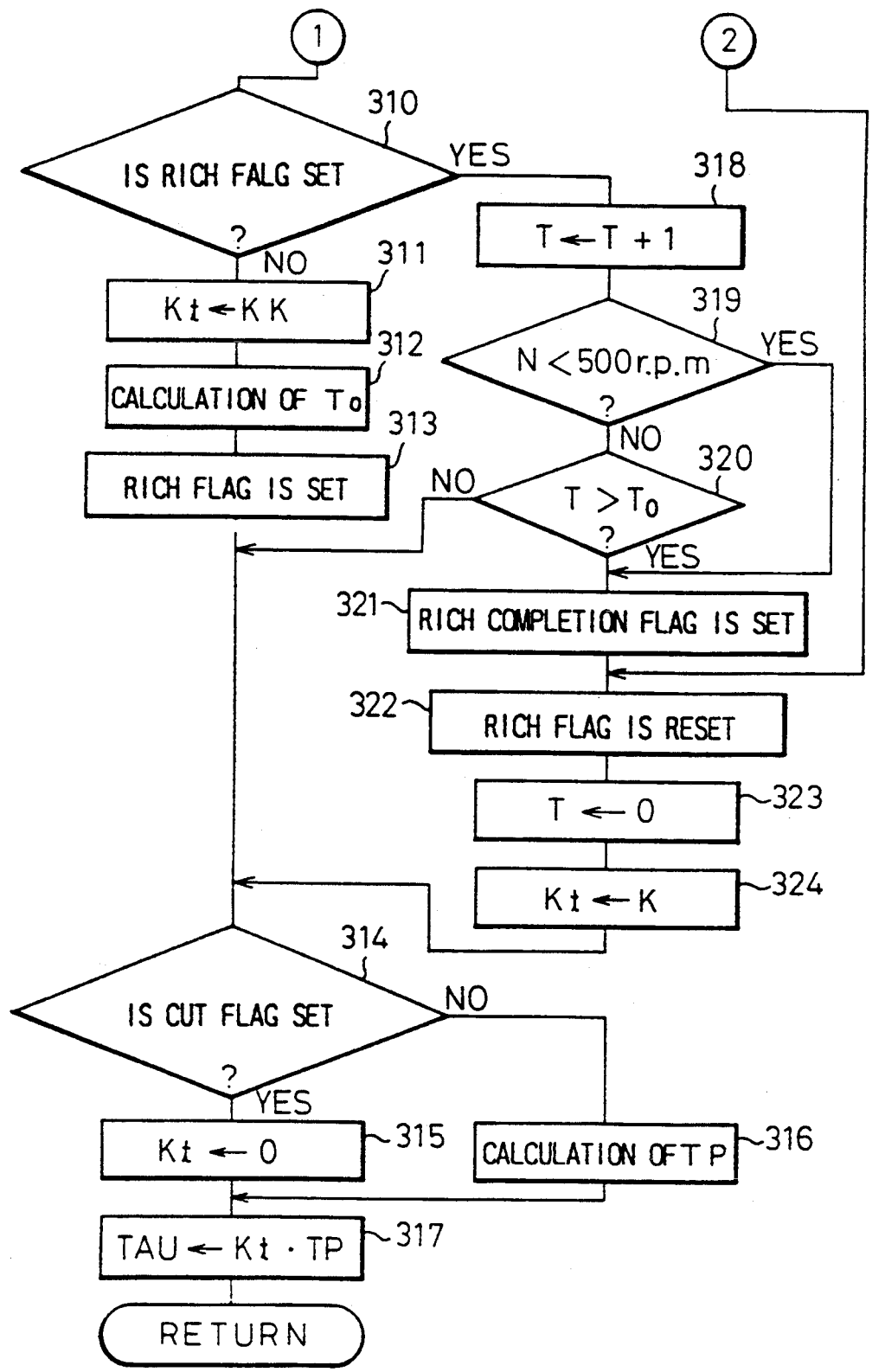

FIGS. 15A and 15B illustrate a routine for executing the second embodiment of an air-fuel ratio control, and this routine is repeatedly executed. Note that, also in this second embodiment, the cut flag processing routine illustrated in FIG. 9 is used when controlling the air-fuel ratio.

Referring to FIGS. 15A and 15B, in step 300, it is determined whether or not the cut flag indicating that the injection of fuel should be stopped is set. When the cut flag is not set, the routine goes to step 301, and it is determined whether or not the value of the correction coefficient $K_t$ is smaller than 1.0. When $K_t < 1.0$, i.e., the air-fuel mixture fed into the combustion chamber 3 is lean, the routine goes to step 302, and the count value C is incremented by one. Then, the routine goes to step 304. Conversely, when $K_t > 1.0$, i.e., the air-fuel ratio of the air-fuel mixture fed into the combustion chamber 3 is the stoichiometric air-fuel ratio or is rich, the routine goes to step 303, and the count value C is made zero. Then, the routine goes to step 304. In addition, when the cut flag is set, the routine jumps to step 304 from step 300. Accordingly, the count value C represents a time during which a lean air-fuel mixture continues to be burned.

In step 304, it is determined whether or not the degree of the opening of the throttle valve 14 is the degree of the opening at idling. When the degree of the opening of the throttle valve 14 is the degree of the opening at idling, the routine goes to step 305, and it is determined whether or not the engine speed N is lower than 900 r.p.m. If N<900 r.p.m., the routine goes to step 306. Namely, when the degree of the opening of the throttle valve 14 is the degree of the opening at idling, and the engine speed N is lower than 900 r.p.m., it is determined that the idling operation of the engine is carried out, and the routine goes to step 306. In step 306, the value of the correction coefficient K is made 1.0, i.e., the target air-fuel ratio of the air-fuel mixture to be fed into the combustion chamber 3 is made the stoichiometric air-fuel ratio, and then the routine goes to step 308. Conversely, when the degree of the opening of the throttle valve 14 is not the degree of the opening at idling, or when N>900 r.p.m., the routine goes to step 307, and the value of the correction coefficient K is calculated from the engine speed N and the absolute pressure PM in the surge tank 10 on the basis of the relationship shown in FIG. 3. Then, the routine goes to step 308.

In step 308, it is determined whether or not the value of the correction coefficient K is equal to 1.0, i.e., the target air-fuel ratio of the air-fuel mixture to be fed into the combustion chamber 3 is the stoichiometric air-fuel ratio. When K=1.0, the routine goes to step 309, and it is determined whether or not a rich completion flag indicating that a process of temporarily making the air-fuel ratio rich is completed is set. When the routine initially goes to step 309 after the value of the correction coefficient K becomes equal to 1.0, the rich completion flag is not set. Accordingly, at this time, the routine goes to step 310, and it is determined whether or not a rich flag indicating that the air-fuel mixture fed into the combustion chamber 3 should be temporarily made rich is set. When the routine initially goes to step 310 after the value of the correction coefficient K becomes equal to 1.0, the rich flag is not set. Accordingly, at this time, the routine goes to step 311, and the value of the correction coefficient $K_t$ is made a predetermined value KK. This predetermined value KK is a value between about 1.1 and 1.2 which makes the air-fuel ratio of the air-fuel mixture a ratio between about 12.0:1 to 13.5:1.

Then, in step 312, the time $T_o$ during which the air-fuel mixture fed into the combustion chamber 3 should be made rich is calculated from the count value C on the basis of the relationship shown in FIG. 14. Then, in step 313, the rich flag is set. Then, the routine goes to step 314, and it is determined whether or not the cut flag is set. When the cut flag is set, the routine goes to step 315, and the value of the correction coefficient $K_t$ is made zero. Then, the routine goes to step 317. Conversely, when the cut flag is not set, the routine goes to step 316. In step 316, the basic fuel injection time TP is calculated from the engine speed N and the absolute pressure PM in the surge tank 10 on the basis of the map shown in FIG. 2, and then, the routine goes to step 317. In step 317, the fuel injection time TAU ($=K_t \cdot TP$) is calculated by multiplying the basic fuel injection time TP by the correction coefficient $K_t$.

If the rich flag is set, the routine goes to step 318 from step 310, and the count value T is incremented by one. Then, in step 319, it is determined whether or not the engine speed N has become lower than a fixed speed, for example, 500 r.p.m. If N>500 r.p.m., the routine goes to step 320, and it is determined whether or not the count value T has become larger than the value $T_o$. If $T<T_o$, the routine goes to step 314.

When it is determined in step 320 that the count value T has become larger than the value $T_o$, the routine goes to step 321, and the rich completion flag is set. Then, in step 322, the rich flag is reset. Then, in step 323, the count value T is made zero, and then, in step 324, the value of the correction coefficient $K_t$ is made the value of the correction coefficient K. If the rich completion flag is set, the routine jumps to step 322 from step 309. Then, the routine goes to step 324 via step 323, and the value of the correction coefficient $K_t$ is made of the value of the correction coefficient K. Accordingly, if the value of the correction coefficient K becomes equal to 1.0, i.e., the target air-fuel ratio of the air-fuel mixture fed into the combustion chamber 3 becomes the stoichiometric air-fuel ratio, the air-fuel ratio of the air-fuel mixture fed into the combustion chamber 3 is made rich ($K_t=KK$) during the time $T_o$ as long as the cut flag is not set. After this, when the time $T_o$ has elapsed, the air-fuel ratio of the air-fuel mixture fed into the combustion chamber 3 is made the stoichiometric air-fuel ratio ($K_t=K$).

If the engine speed N drops below 500 r.p.m. when the air-fuel mixture fed into the combustion chamber 3 is rich, the routine jumps to step 321 from step 319. Then, the routine goes to step 324 via steps 322 and 323, and the value of the correction coefficient $K_t$ is made the value of the correction coefficient K. Accordingly, at this time, the air-fuel ratio of the air-fuel mixture fed into the combustion chamber 3 is changed over from rich to the stoichiometric air-fuel ratio.

When it is determined in step 308 that the correction coefficient K is not equal to 1.0, i.e., the target air-fuel ratio of the air-fuel mixture fed into the combustion chamber 3 is lean or rich, the routine goes to step 325, and the rich completion flag is reset. Then, the routine goes to step 324 via steps 322 and 323, and the value of the correction coefficient $K_t$ is made the value of the correction coefficient K. Accordingly, at this time, the air-fuel mixture fed into the combustion chamber 3 is made lean or rich as long as the cut flag is not set. Note that, where the cut flag is set, since the value of the correction coefficient $K_t$ is made zero at step 315, the injection of fuel is stopped.

Figure 16:
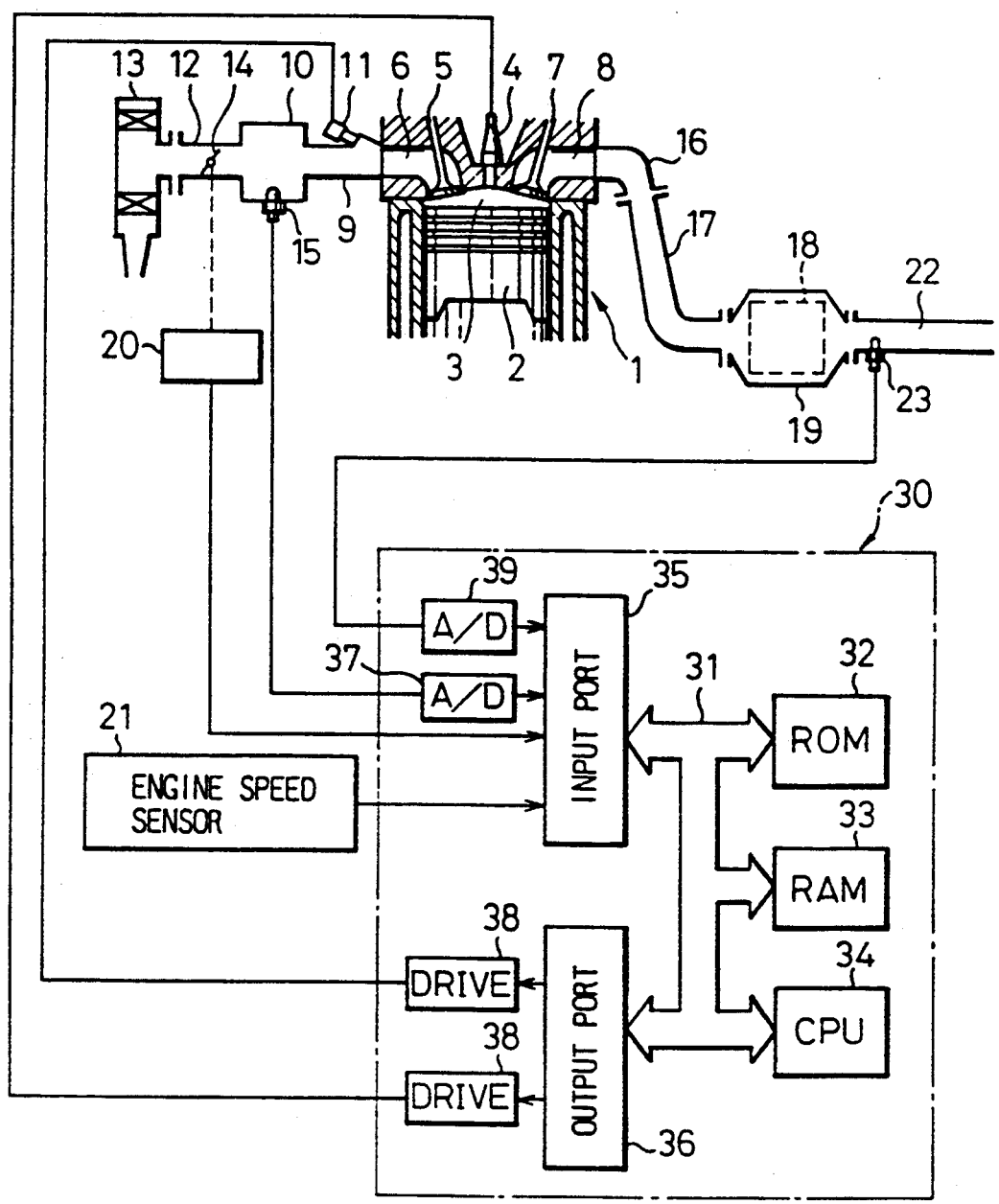
FIG. 16 is an overall view of another embodiment of an engine.

FIG. 16 illustrates a third embodiment according to the present invention. As shown in FIG. 16, in this embodiment, a HC concentration sensor 23 for detecting the concentration of HC in the exhaust gas is arranged in the exhaust passage 22 downstream of the $NO_x$ absorbent 18. This HC concentration sensor 23 produces an output voltage which is proportional to the concentration of HC, and this output voltage is input into the input port 35 via an AD converter 39.

When the target air-fuel ratio of the air-fuel mixture fed into the combustion chamber 3 is changed over from lean to the stoichiometric air-fuel ratio, if the air-fuel mixture is temporarily made rich as illustrated by $T_o$ in FIGS. 11 through 13, a large amount of unburned HC and CO discharged from the combustion chamber 3 at this time is used for reducing the $NO_x$ released from the $NO_x$ absorbent 18. Accordingly, $NO_x$, HC and CO are not substantially discharged into the exhaust passage 22 downstream of the $NO_x$ absorbent 18 during the time the releasing operation of the $NO_x$ from the $NO_x$ absorbent 18 is carried out. After this, when the releasing operation of the $NO_x$ from the $NO_x$ absorbent 18 is completed, since the unburned HC and CO is no longer used for reducing the $NO_x$, a large amount of the unburned HC and CO is discharged into the exhaust passage 22 of the $NO_x$ absorbent 18. Accordingly, it is possible to determine that the releasing operation of the $NO_x$ from the $NO_x$ absorbent 18 is completed from the fact that the concentration of the unburned HC in the exhaust gas flowing out from the $NO_x$ absorbent 18 becomes high.

In this case, if the air-fuel ratio of the air-fuel mixture fed into the combustion chamber 3 is changed over from rich to the stoichiometric air-fuel ratio when the concentration of the unburned HC in the exhaust gas flowing out from the $NO_x$ absorbent 18 becomes high, it is possible to completely release the $NO_x$ absorbed in the $NO_x$ absorbent 18 therefrom, and it is also possible to prevent a large amount of unburned HC and CO from being discharged into the outside air. Therefore, in the third embodiment, the HC concentration $C_{CH}$ in the exhaust gas flowing out from the $NO_x$ absorbent 18 is detected by the HC concentration sensor 23, and the air-fuel ratio of the air-fuel mixture fed into the combustion chamber 3 is changed over from rich to the stoichiometric air-fuel ratio when the HC concentration $C_{HC}$ exceeds a predetermined value $\beta$.

Figure 17A:
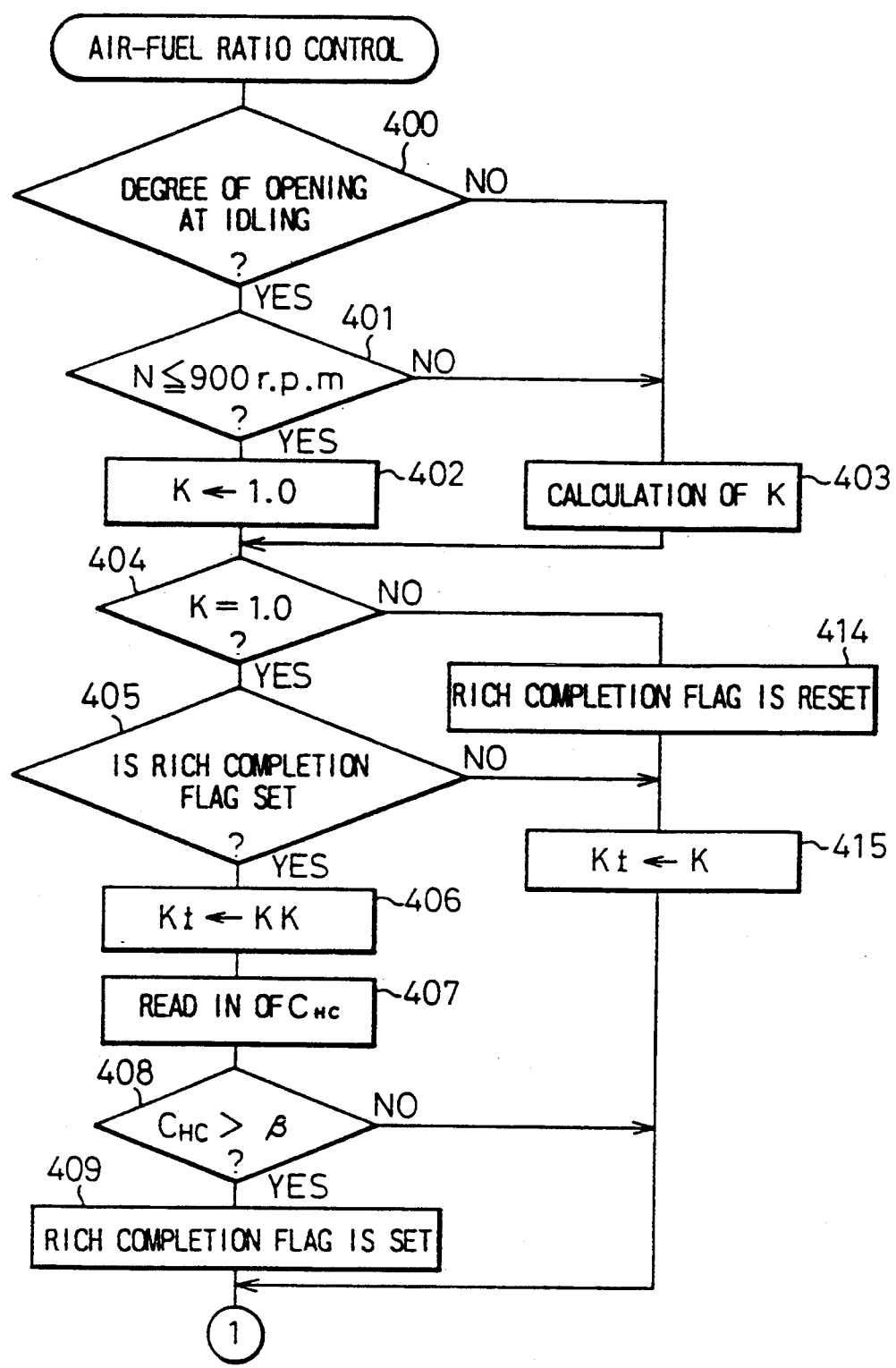
FIGS. 17A and 17B are a flowchart of a third embodiment for executing the air-fuel ratio control.
Figure 17B:
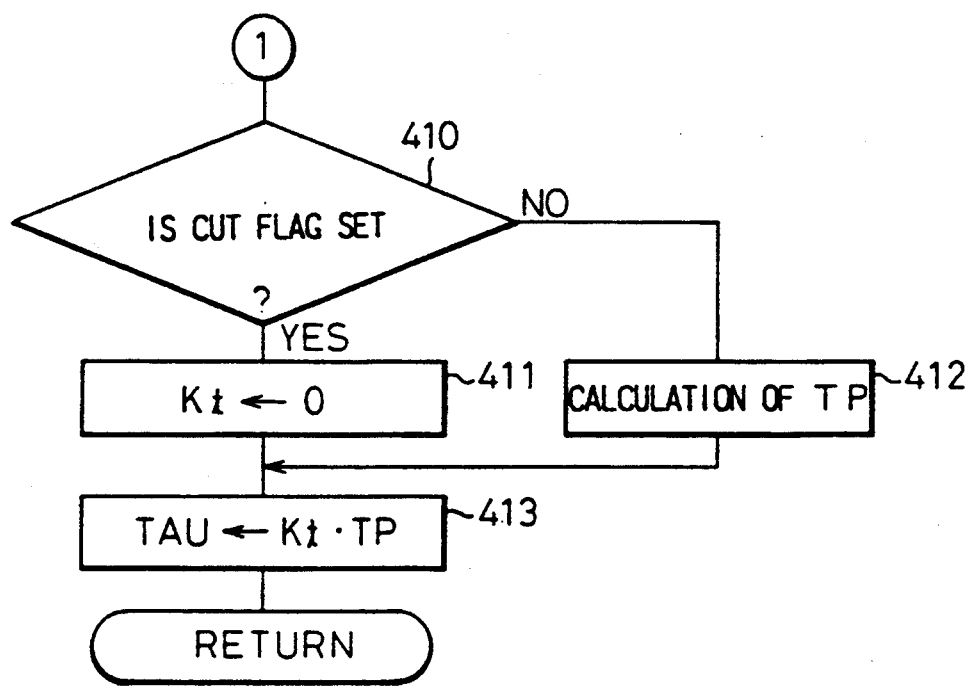

FIGS. 17A and 17B illustrate a routine for executing the third embodiment of an air-fuel ratio control, and this routine is repeatedly executed. Note that, also in this second embodiment, the cut flag processing routine illustrated in FIG. 9 is used when controlling the air-fuel ratio.

Referring to FIGS. 17A and 17B, in step 400, it is determined whether or not the degree of the opening of the throttle valve 14 is the degree of the opening at idling. When the degree of the opening of the throttle valve 14 is the degree of the opening at idling, the routine goes to step 401, and it is determined whether or not the engine speed N is lower than 900 r.p.m. If N<900 r.p.m., the routine goes to step 402. Namely, when the degree of the opening of the throttle valve 14 is the degree of the opening at idling, and the engine speed N is lower than 900 r.p.m., it is determined that the idling operation of the engine is carried out, and the routine goes to step 402. In step 402, the value of the correction coefficient K is made 1.0, i.e., the target air-fuel ratio of the air-fuel mixture to be fed into the combustion chamber 3 is made the stoichiometric air-fuel ratio, and then the routine goes to step 404. Conversely, when the degree of the opening of the throttle valve 14 is not the degree of the opening at idling, or when N>900 r.p.m., the routine goes to step 403, and the value of the correction coefficient K is calculated from the engine speed N and the absolute pressure PM in the surge tank 10 on the basis of the relationship shown in FIG. 3. Then, the routine goes to step 404.

In step 404, it is determined whether or not the value of the correction coefficient K is equal to 1.0, i.e., the target air-fuel ratio of the air-fuel mixture to be fed into the combustion chamber 3 is the stoichiometric air-fuel ratio. When K=1.0, the routine goes to step 405, and it is determined whether or not a rich completion flag indicating that a process of temporarily making the air-fuel ratio rich is completed is set. When the routine initially goes to step 405 after the value of the correction coefficient K becomes equal to 1.0, the rich completion flag is not set. Accordingly, at this time, the routine goes to step 406, and the value of the correction coefficient $K_t$ is made a predetermined value KK. This predetermined value KK is a value between about 1.1 and 1.2 which makes the air-fuel ratio of the air-fuel mixture a ratio between about 12.0:1 to 13.5:1.

Then, in step 407, the HC concentration $C_{HC}$ detected by the HC concentration sensor 23 is read in, and then in step 408, it is determined whether or not the HC concentration $C_{HC}$ becomes larger than a predetermined value $\beta$. If $C_{HC} \leq \beta$, the routine goes to step 410, and it is determined whether or not the cut flag is set. When the cut flag is set, the routine goes to step 411, and the value of the correction coefficient $K_t$ is made zero. Then, the routine goes to step 413. Conversely, when the cut flag is not set, the routine goes to step 412. In step 412, the basic fuel injection time TP is calculated from the engine speed N and the absolute pressure PM in the surge tank 10 on the basis of the map shown in FIG. 2, and then, the routine goes to step 413. In step 413, the fuel injection time TAU ($=K_t \cdot$TP) is calculated by multiplying the basic fuel injection time TP by the correction coefficient $K_t$.

When it is determined in step 408 that $C_{HC} > \beta$, the routine goes to step 409, and the rich completion flag is set. Then, the routine goes to step 413 via steps 410 and 411 or via steps 410 and 412. If the rich completion flag is set, the routine goes to step 415 from step 405, and the value of the correction coefficient $K_t$ is made the value of the correction coefficient K. Then, the routine goes to step 413 via steps 410 and 411 or via steps 410 and 412. Accordingly, if the value of the correction coefficient K becomes equal to 1.0, i.e., the target air-fuel ratio of the air-fuel mixture fed into the combustion chamber 3 becomes the stoichiometric air-fuel ratio, the air-fuel ratio of the air-fuel mixture fed into the combustion chamber 3 is made rich ($K_t$=KK) as long as the cut flag is not set. After this, when the HC concentration $C_{HC}$ exceeds the predetermined value $\beta$, the air-fuel ratio of the air-fuel mixture fed into the combustion chamber 3 is made the stoichiometric air-fuel ratio ($K_t$=K).

When it is determined in step 404 that the correction coefficient K is not equal to 1.0, i.e., the target air-fuel ratio of the air-fuel mixture fed into the combustion chamber 3 is lean or rich, the routine goes to step 414, and the rich completion flag is reset. Then, the routine goes to step 415, and the value of the correction coefficient $K_t$ is made the value of the correction coefficient K. Accordingly, at this time, the air-fuel mixture fed into the combustion chamber 3 is made lean or rich as long as the cut flag is not set. Note that, where the cut flag is set, since the value of the correction coefficient $K_t$ is made zero at step 411, the injection of fuel is stopped.

According to the present invention, when the engine operating region is changed over from a region in which a lean air-fuel mixture is burned to a region in which an air-fuel mixture of the stoichiometric air-fuel ratio should be burned, it is possible to prevent the $NO_x$ from being discharged into the outside air.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas purification device of an engine having an exhaust passage, said device comprising:

a $NO_x$ absorbent arranged in the exhaust passage and absorbing $NO_x$ when an air-fuel ratio of exhaust gas flowing into said $NO_x$ absorbent is lean, said $NO_x$ absorbent releasing absorbed $NO_x$ when the concentration of oxygen in the exhaust gas flowing into said $NO_x$ absorbent is lowered;

determining means for determining whether an engine operating region belongs to a first engine operating region in which an air-fuel ratio of an air-fuel mixture fed into the engine should be made approximately the stoichiometric air-fuel ratio or a second engine operating region in which the amount of fuel fed into the engine is reduced below the amount of fuel which is necessary to make said air-fuel ratio of the air-fuel mixture the stoichiometric air-fuel ratio; and an air-fuel ratio control means for controlling said air-fuel ratio of the air-fuel mixture to make said air-fuel ratio of the air-fuel mixture approximately the stoichiometric air-fuel ratio after temporarily making said air-fuel ratio of the air-fuel mixture rich when the engine operating region is changed over from said second engine operating region to said first engine operating region.

2. An exhaust gas purifying device according to claim 1, wherein said air-fuel ratio of the air-fuel mixture is made lean in said second engine operating region.

3. An exhaust gas purification-device according to claim 2, wherein said first engine operating region is a region in which the idling operation of the engine is carried out, and said second engine operating region is a region in which the engine is operating under a low and middle load.

4. An exhaust gas purification device according to claim 3, wherein said air-fuel control means immediately changes over said air-fuel ratio of the air-fuel mixture from rich to approximately the stoichiometric air-fuel ratio when an engine speed drops below a predetermined speed during the time said air-fuel ratio of the air-fuel mixture is temporarily made rich.

5. An exhaust gas purification device according to claim 2, wherein said first engine operating region is a region in which the engine is operating under a heavy load, and said second engine operating region is a region in which the engine is operating under a low and middle load.

6. An exhaust gas purification device according to claim 1, further comprising means for stopping a supply of fuel to the engine when the engine is decelerated and for starting the supply of fuel to the engine again when an engine speed drops below a predetermined speed, said first engine operating region being a region in which the supply of fuel is started, said second engine operating region being a region in which the supply of fuel is stopped, said air-fuel ratio control means temporarily making said air-fuel ratio of the air-fuel mixture rich when the supply of fuel is started again.

7. An exhaust gas purification device according to claim 1, wherein said air-fuel ratio control means temporarily makes said air-fuel ratio of the air-fuel mixture rich for a time which is necessary to release almost all the absorbed $NO_x$ from said $NO_x$ absorbent.

8. An exhaust gas purification device according to claim 7, wherein means for calculating a time during which a lean air-fuel mixture continues to be burned is provided, and the time during which said air-fuel ratio of the air-fuel mixture is temporarily made rich is made shorter as the time during which the lean air-fuel mixture continues to be burned becomes short.

9. An exhaust gas purification device according to claim 1, further comprising means for detecting the concentration of HC in the exhaust gas discharged from said $NO_x$ absorbent, said air-fuel ratio control means changing over said air-fuel ratio of the air-fuel mixture from rich to approximately the stoichiometric air-fuel ratio when said concentration of HC exceeds a predetermined value.

10. An exhaust gas purification device according to claim 1, wherein said $NO_x$ absorbent contains at least one substance selected from alkali metals comprising potassium, sodium, lithium, cesium; alkali earth metals comprising barium, calcium; and rare earth metals comprising lanthanum, yttrium and contains platinum.

* * * * *